(12) United States Patent
Hosoi et al.

(10) Patent No.: US 9,980,024 B2
(45) Date of Patent: *May 22, 2018

(54) HEARING SYSTEM AND FINGER RING FOR THE HEARING SYSTEM

(71) Applicants: Rohm Co., Ltd., Kyoto (JP); Finewell Co., Ltd., Osaka (JP)

(72) Inventors: Hiroshi Hosoi, Osaka (JP); Yoji Hosoi, Osaka (JP); Masahide Tanaka, Osaka (JP)

(73) Assignees: Rohm Co., Ltd., Kyoto (JP); Finewell Co., Ltd., Osaka (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/285,581

(22) Filed: Oct. 5, 2016

(65) Prior Publication Data

US 2017/0026727 A1 Jan. 26, 2017

Related U.S. Application Data

(63) Continuation of application No. 14/676,085, filed on Apr. 1, 2015, now Pat. No. 9,485,559, which is a
(Continued)

(30) Foreign Application Priority Data

Feb. 25, 2011 (JP) ................................. 2011-040293

(51) Int. Cl.
*H04R 25/00* (2006.01)
*H04R 1/02* (2006.01)
(Continued)

(52) U.S. Cl.
CPC .............. *H04R 1/028* (2013.01); *A44C 9/00* (2013.01); *H04R 1/46* (2013.01); *H04R 17/005* (2013.01);
(Continued)

(58) Field of Classification Search
CPC .............. H04R 2460/13; H04R 25/606; H04R 2201/023; H04R 2225/61; H04R 2420/07;
(Continued)

(56) References Cited

U.S. PATENT DOCUMENTS

| 2,045,404 A | 6/1936 | Nicholides |
| 4,351,166 A | 9/1982 | Belin |

(Continued)

FOREIGN PATENT DOCUMENTS

| CN | 2198618 Y | 5/1995 |
| CN | 1672114 | 9/2005 |

(Continued)

OTHER PUBLICATIONS

Japan Patent Office, International Search Report for PCT/JP2015/071490 dated Nov. 2, 2015 with English translation.
(Continued)

*Primary Examiner* — Norman Yu
(74) *Attorney, Agent, or Firm* — Fish & Richardson P.C.

(57) ABSTRACT

The hearing system comprises a finger ring and a hearing device body. The finger ring includes: a first short-distance wireless communication portion; a vibration output portion disposed at a position that contacts a finger to convert a voice signal, which is received by the first short-distance wireless communication portion, into a cartilage conduction vibration and outputs it; and a first power source portion that supplies power to the first short-distance wireless communication portion and the vibration output portion. The talk device body includes: a second short-distance wireless communication portion that communicates with the first short-distance wireless communication portion; a microphone; a voice signal output portion that makes the second short-distance wireless communication portion output the voice signal according to a voice captured by the microphone; and
(Continued)

a second power source portion that supplies power to the second short-distance wireless communication portion, the microphone, and the voice signal output portion.

11 Claims, 9 Drawing Sheets

Related U.S. Application Data continuation of application No. 13/985,913, filed as application No. PCT/JP2012/053231 on Feb. 13, 2012, now Pat. No. 9,020,170.

(51) Int. Cl.
*A44C 9/00* (2006.01)
*H04R 1/46* (2006.01)
*H04R 17/00* (2006.01)
*H04R 25/04* (2006.01)
*H04W 4/00* (2018.01)

(52) U.S. Cl.
CPC ......... *H04R 25/554* (2013.01); *H04R 25/558* (2013.01); *H04R 25/04* (2013.01); *H04R 2201/023* (2013.01); *H04R 2420/03* (2013.01); *H04R 2460/13* (2013.01); *H04W 4/008* (2013.01)

(58) Field of Classification Search
CPC ........ H04R 25/554; H04R 1/10; H04R 1/105; G06F 3/014; H04M 1/05; H04M 1/6066
USPC ...... 381/151, 315, 326, 380, 162, 23.1, 312, 381/56
See application file for complete search history.

(56) References Cited

U.S. PATENT DOCUMENTS

| | | | |
|---|---|---|---|
| 5,295,193 A | 3/1994 | Ono | |
| 5,323,468 A | 6/1994 | Bottesch | |
| 5,396,563 A | 3/1995 | Yoshimi | |
| 5,956,682 A | 9/1999 | Loudermilk | |
| 6,028,556 A | 2/2000 | Shiraki | |
| 6,380,923 B1 * | 4/2002 | Fukumoto | G06F 1/163 341/22 |
| 6,456,721 B1 | 9/2002 | Fukuda | |
| 6,463,157 B1 | 10/2002 | May | |
| 6,825,830 B1 | 11/2004 | Kanesaka et al. | |
| 6,912,287 B1 | 6/2005 | Fukumoto et al. | |
| 6,950,126 B1 | 9/2005 | Homma et al. | |
| 7,231,235 B2 | 6/2007 | Harrold | |
| 7,257,372 B2 | 8/2007 | Kaltenbach | |
| 7,437,122 B2 | 10/2008 | Choi | |
| 7,442,164 B2 | 10/2008 | Berrang et al. | |
| 7,555,136 B2 | 6/2009 | Wang | |
| 7,616,771 B2 | 11/2009 | Lenhardt | |
| 7,822,215 B2 | 10/2010 | Carazo | |
| 7,890,147 B2 | 2/2011 | Tanada | |
| 8,521,239 B2 | 8/2013 | Hosoi et al. | |
| 8,526,646 B2 | 9/2013 | Boesen | |
| 8,532,322 B2 | 9/2013 | Parker | |
| 8,886,263 B2 | 11/2014 | Hosoi et al. | |
| 8,918,149 B2 | 12/2014 | Hosoi et al. | |
| 9,020,168 B2 | 4/2015 | Karkkainen | |
| 9,020,170 B2 | 4/2015 | Hosoi et al. | |
| 2001/0011951 A1 | 8/2001 | Kimata et al. | |
| 2001/0026626 A1 | 10/2001 | Athanas | |
| 2002/0001381 A1 | 1/2002 | Mori | |
| 2002/0012441 A1 | 1/2002 | Matsunaga et al. | |
| 2002/0068995 A1 | 6/2002 | Yoshida | |
| 2002/0114214 A1 | 8/2002 | Hansen et al. | |
| 2002/0115478 A1 | 8/2002 | Fujisawa et al. | |
| 2002/0149561 A1 | 10/2002 | Fukumoto et al. | |
| 2002/0183014 A1 | 12/2002 | Takeda et al. | |
| 2003/0108209 A1 | 6/2003 | McIntosh | |
| 2003/0118197 A1 | 6/2003 | Nagayasu et al. | |
| 2003/0119566 A1 | 6/2003 | Chen | |
| 2003/0174856 A1 | 9/2003 | Johannsen et al. | |
| 2004/0013279 A1 | 1/2004 | Takeda | |
| 2004/0048633 A1 | 3/2004 | Sato et al. | |
| 2004/0086149 A1 | 5/2004 | Johannsen et al. | |
| 2004/0087346 A1 | 5/2004 | Johannsen et al. | |
| 2004/0105566 A1 | 6/2004 | Matsunaga et al. | |
| 2004/0131211 A1 | 7/2004 | Miyata et al. | |
| 2004/0132509 A1 | 7/2004 | Glezerman | |
| 2004/0189151 A1 | 9/2004 | Athanas | |
| 2004/0207542 A1 | 10/2004 | Chang et al. | |
| 2004/0259513 A1 | 12/2004 | Park | |
| 2005/0031152 A1 | 2/2005 | Hansen et al. | |
| 2005/0046790 A1 | 3/2005 | Jannard et al. | |
| 2005/0088530 A1 | 4/2005 | Homma et al. | |
| 2005/0160270 A1 | 7/2005 | Goldberg | |
| 2005/0176459 A1 | 8/2005 | Fukuda | |
| 2005/0184875 A1 | 8/2005 | Schmandt et al. | |
| 2005/0185813 A1 | 8/2005 | Sinclair et al. | |
| 2005/0207599 A1 * | 9/2005 | Fukumoto | G06F 1/163 381/151 |
| 2005/0213432 A1 | 9/2005 | Hoshuyama | |
| 2005/0232436 A1 | 10/2005 | Nagayasu et al. | |
| 2005/0237685 A1 | 10/2005 | Miyata | |
| 2005/0244020 A1 | 11/2005 | Nakajima et al. | |
| 2005/0260969 A1 | 11/2005 | Nagata et al. | |
| 2005/0275714 A1 | 12/2005 | Ishikawa et al. | |
| 2005/0286734 A1 | 12/2005 | Wang | |
| 2006/0079291 A1 | 4/2006 | Granovetter et al. | |
| 2006/0093161 A1 | 5/2006 | Falcon | |
| 2006/0094464 A1 | 5/2006 | Kyou et al. | |
| 2006/0113932 A1 | 6/2006 | Mori et al. | |
| 2006/0120546 A1 | 6/2006 | Tanaka et al. | |
| 2006/0121960 A1 | 6/2006 | Wang | |
| 2006/0140439 A1 | 6/2006 | Nakagawa | |
| 2006/0158064 A1 | 7/2006 | Asakawa et al. | |
| 2006/0159297 A1 | 7/2006 | Wirola et al. | |
| 2006/0171107 A1 | 8/2006 | Yamamoto et al. | |
| 2006/0215873 A1 | 9/2006 | Hansen et al. | |
| 2006/0216022 A1 | 9/2006 | Lee et al. | |
| 2006/0227984 A1 | 10/2006 | Sinclair | |
| 2006/0262951 A1 | 11/2006 | Jun | |
| 2006/0286998 A1 | 12/2006 | Fukuda | |
| 2007/0003098 A1 | 1/2007 | Martenson | |
| 2007/0015467 A1 | 1/2007 | Nagayasu et al. | |
| 2007/0019452 A1 | 1/2007 | Ohkubo et al. | |
| 2007/0036370 A1 | 2/2007 | Granovetter et al. | |
| 2007/0057601 A1 | 3/2007 | Kawase et al. | |
| 2007/0080951 A1 | 4/2007 | Maruyama et al. | |
| 2007/0081679 A1 | 4/2007 | Suzuki et al. | |
| 2007/0098200 A1 | 5/2007 | Takei | |
| 2007/0160253 A1 * | 7/2007 | Takei | H04M 1/05 381/380 |
| 2007/0249395 A1 | 10/2007 | Kondo et al. | |
| 2007/0263893 A1 | 11/2007 | Kim | |
| 2007/0269777 A1 | 11/2007 | Fux | |
| 2007/0297637 A1 | 12/2007 | Sugiyama et al. | |
| 2008/0008344 A1 | 1/2008 | Wakabayashi et al. | |
| 2008/0054862 A1 | 3/2008 | Hara | |
| 2008/0106449 A1 | 5/2008 | Doi | |
| 2008/0107300 A1 | 5/2008 | Chen | |
| 2008/0129703 A1 | 6/2008 | Takeshita et al. | |
| 2008/0139254 A1 | 6/2008 | Levy | |
| 2008/0143512 A1 | 6/2008 | Wakisaka et al. | |
| 2008/0170725 A1 | 7/2008 | Asada et al. | |
| 2008/0227490 A1 | 9/2008 | Homma et al. | |
| 2008/0227501 A1 | 9/2008 | Joo et al. | |
| 2008/0239061 A1 | 10/2008 | Cok et al. | |
| 2008/0240465 A1 | 10/2008 | Shiraishi | |
| 2008/0247562 A1 | 10/2008 | Nagayasu et al. | |
| 2008/0267433 A1 | 10/2008 | Katou et al. | |
| 2008/0297373 A1 | 12/2008 | Hayakawa et al. | |
| 2009/0002626 A1 | 1/2009 | Wakabayashi | |
| 2009/0028356 A1 | 1/2009 | Ambrose et al. | |
| 2009/0129620 A1 | 5/2009 | Tagawa et al. | |
| 2009/0184884 A1 | 7/2009 | Kyou et al. | |

(56) References Cited

U.S. PATENT DOCUMENTS

| | | |
|---|---|---|
| 2009/0226011 A1 | 9/2009 | Abolfathi et al. |
| 2009/0226017 A1 | 9/2009 | Abolfathi et al. |
| 2009/0226020 A1 | 9/2009 | Abolfathi et al. |
| 2009/0245556 A1 | 10/2009 | Parker et al. |
| 2009/0245557 A1 | 10/2009 | Parker |
| 2009/0288489 A1 | 11/2009 | Lee et al. |
| 2009/0290730 A1 | 11/2009 | Fukuda et al. |
| 2009/0304210 A1 | 12/2009 | Weisman |
| 2009/0323976 A1 | 12/2009 | Asada et al. |
| 2010/0056227 A1 | 3/2010 | Hayakawa et al. |
| 2010/0061582 A1 | 3/2010 | Takigawa et al. |
| 2010/0061584 A1 | 3/2010 | Lin et al. |
| 2010/0098269 A1 | 4/2010 | Abolfathi et al. |
| 2010/0150368 A1 | 6/2010 | Chang et al. |
| 2010/0172519 A1 | 7/2010 | Kimura et al. |
| 2010/0178597 A1 | 7/2010 | Ishida et al. |
| 2010/0178957 A1 | 7/2010 | Chen |
| 2010/0184487 A1 | 7/2010 | Takada |
| 2010/0216526 A1 | 8/2010 | Chen et al. |
| 2010/0238108 A1 | 9/2010 | Rekimoto |
| 2010/0246878 A1 | 9/2010 | Sim et al. |
| 2010/0254562 A1 | 10/2010 | Koo |
| 2010/0310086 A1 | 12/2010 | Magrath et al. |
| 2010/0311462 A1 | 12/2010 | Endo |
| 2010/0322127 A1 | 12/2010 | Nakajima |
| 2010/0328033 A1 | 12/2010 | Kamei |
| 2010/0329485 A1 | 12/2010 | Fukuda et al. |
| 2011/0143819 A1 | 6/2011 | Sugiyama et al. |
| 2011/0158425 A1 | 6/2011 | Hayakawa |
| 2011/0159855 A1 | 6/2011 | Cheng |
| 2011/0170718 A1 | 7/2011 | Fukuda et al. |
| 2011/0180542 A1 | 7/2011 | Drollinger et al. |
| 2011/0201301 A1 | 8/2011 | Okada et al. |
| 2011/0224481 A1 | 9/2011 | Lee et al. |
| 2011/0237306 A1 | 9/2011 | Kamii |
| 2011/0254616 A1 | 10/2011 | Kawano |
| 2011/0267551 A1 | 11/2011 | Yokote et al. |
| 2011/0280416 A1 | 11/2011 | Abolfathi et al. |
| 2011/0281617 A1 | 11/2011 | Kim et al. |
| 2011/0293105 A1 | 12/2011 | Arie et al. |
| 2011/0299695 A1 | 12/2011 | Nicholson |
| 2011/0301729 A1 | 12/2011 | Heiman et al. |
| 2012/0008793 A1 | 1/2012 | Knox et al. |
| 2012/0008807 A1 | 1/2012 | Gran |
| 2012/0010735 A1 | 1/2012 | Gilboa |
| 2012/0082329 A1 | 4/2012 | Neumeyer |
| 2012/0082335 A1 | 4/2012 | Duisters et al. |
| 2012/0105192 A1 | 5/2012 | Norieda |
| 2012/0130660 A1 | 5/2012 | Neumeyer |
| 2012/0133213 A1 | 5/2012 | Borke et al. |
| 2012/0139750 A1 | 6/2012 | Hayakawa et al. |
| 2012/0140917 A1 | 6/2012 | Nicholson et al. |
| 2012/0162143 A1 | 6/2012 | Kai et al. |
| 2012/0182429 A1 | 7/2012 | Forutanpour et al. |
| 2012/0183163 A1 | 7/2012 | Apfel |
| 2012/0219161 A1 | 8/2012 | Amada |
| 2012/0221329 A1 | 8/2012 | Harsch |
| 2012/0237075 A1 | 9/2012 | East et al. |
| 2012/0244917 A1 | 9/2012 | Hosoi et al. |
| 2012/0249223 A1 | 10/2012 | Neugebauer |
| 2012/0253236 A1 | 10/2012 | Snow |
| 2012/0289162 A1 | 11/2012 | Hosoi et al. |
| 2012/0298441 A1 | 11/2012 | Lin et al. |
| 2012/0300956 A1 | 11/2012 | Horii |
| 2013/0039508 A1 | 2/2013 | Chen et al. |
| 2013/0100596 A1 | 4/2013 | Yokote et al. |
| 2013/0111346 A1 | 5/2013 | Little |
| 2013/0120311 A1 | 5/2013 | Ichikawa |
| 2013/0136279 A1 | 5/2013 | Brown |
| 2013/0142348 A1 | 6/2013 | Weisman |
| 2013/0169352 A1 | 7/2013 | Kawano |
| 2013/0169829 A1 | 7/2013 | Homma et al. |
| 2013/0191114 A1 | 7/2013 | Gim |
| 2013/0236043 A1 | 9/2013 | Abolfathi et al. |
| 2013/0242262 A1 | 9/2013 | Lewis |
| 2013/0242809 A1 | 9/2013 | Tone et al. |
| 2013/0252675 A1 | 9/2013 | Nicholson |
| 2013/0259221 A1 | 10/2013 | Shusaku et al. |
| 2013/0301860 A1 | 11/2013 | Neumeyer et al. |
| 2013/0308799 A1 | 11/2013 | Lin et al. |
| 2013/0316691 A1 | 11/2013 | Forutanpour et al. |
| 2013/0322670 A1 | 12/2013 | Hosoi et al. |
| 2013/0324193 A1 | 12/2013 | Hosoi et al. |
| 2013/0335210 A1 | 12/2013 | Arai et al. |
| 2013/0336507 A1 | 12/2013 | Gran |
| 2014/0003641 A1 | 1/2014 | Neumeyer et al. |
| 2014/0313280 A1 | 10/2014 | Takuno et al. |
| 2014/0342783 A1 | 11/2014 | Suzuki et al. |
| 2014/0378191 A1 | 12/2014 | Hosoi et al. |
| 2015/0054779 A1 | 2/2015 | Horii et al. |
| 2015/0065057 A1 | 3/2015 | Hosoi et al. |
| 2015/0070083 A1 | 3/2015 | Kawano |
| 2015/0078569 A1 | 3/2015 | Magrath et al. |
| 2015/0086047 A1 | 3/2015 | Horii et al. |
| 2015/0131838 A1 | 5/2015 | Horii |
| 2015/0141088 A1 | 5/2015 | Hosoi et al. |
| 2015/0172588 A1 | 6/2015 | Homma et al. |
| 2015/0181338 A1 | 6/2015 | Hosoi et al. |
| 2015/0208153 A1 | 7/2015 | Hosoi et al. |
| 2015/0256946 A1 | 9/2015 | Neumeyer et al. |
| 2016/0007109 A1 | 1/2016 | Neumeyer et al. |
| 2016/0086594 A1 | 3/2016 | Asada et al. |
| 2016/0205233 A1 | 7/2016 | Hosoi et al. |
| 2016/0248894 A1 | 8/2016 | Hosoi et al. |
| 2016/0261299 A1 | 9/2016 | Hosoi et al. |
| 2016/0286296 A1 | 9/2016 | Hosoi et al. |
| 2017/0006144 A1 | 1/2017 | Hosoi et al. |
| 2017/0026727 A1 | 1/2017 | Hosoi et al. |
| 2017/0302320 A1 | 10/2017 | Hosoi et al. |

FOREIGN PATENT DOCUMENTS

| | | |
|---|---|---|
| CN | 1679371 A | 10/2005 |
| CN | 1791283 | 6/2006 |
| CN | 1843019 A | 10/2006 |
| CN | 101267463 | 9/2008 |
| CN | 101277331 | 10/2008 |
| CN | 101355823 A | 1/2009 |
| CN | 101360140 | 2/2009 |
| CN | 101390440 | 3/2009 |
| CN | 201216023 | 4/2009 |
| CN | 101513081 A | 8/2009 |
| CN | 101795143 | 8/2010 |
| CN | 101897198 A | 11/2010 |
| CN | 102075633 | 5/2011 |
| EP | 1705875 A2 | 3/2005 |
| EP | 1705075 | 9/2006 |
| EP | 1705874 A1 | 9/2006 |
| EP | 1 783 919 | 5/2007 |
| EP | 1970792 | 9/2008 |
| JP | S51-94220 | 8/1976 |
| JP | S55-088497 | 7/1980 |
| JP | S56-17780 U | 2/1981 |
| JP | S56-089086 | 7/1981 |
| JP | S56-90018 U | 7/1981 |
| JP | S58-182398 | 10/1983 |
| JP | S60116800 U | 8/1985 |
| JP | S62-208680 | 9/1987 |
| JP | S63-115728 U | 7/1988 |
| JP | 63-142981 | 9/1988 |
| JP | S63140753 U | 9/1988 |
| JP | H02-12099 | 1/1990 |
| JP | H02-62199 | 3/1990 |
| JP | 3-29424 | 2/1991 |
| JP | H03-117995 U | 12/1991 |
| JP | 4-90298 | 3/1992 |
| JP | H0573073 | 3/1993 |
| JP | H05-41297 | 6/1993 |
| JP | H05-183618 | 7/1993 |
| JP | H05-207579 | 8/1993 |
| JP | H05-292167 | 11/1993 |
| JP | 06-030494 | 2/1994 |

(56) References Cited

FOREIGN PATENT DOCUMENTS

| | | |
|---|---|---|
| JP | 3003950 U | 8/1994 |
| JP | 3009206 U | 1/1995 |
| JP | 07-107146 | 4/1995 |
| JP | 07-131268 A | 5/1995 |
| JP | H7-039150 U | 7/1995 |
| JP | H07210176 | 8/1995 |
| JP | 08-033026 A | 2/1996 |
| JP | H879338 | 3/1996 |
| JP | 8-102780 | 4/1996 |
| JP | H08-090986 | 4/1996 |
| JP | H08111703 | 4/1996 |
| JP | 08-237185 A | 9/1996 |
| JP | H08-256080 | 10/1996 |
| JP | H09-023256 | 1/1997 |
| JP | H10-042021 | 2/1998 |
| JP | 3050147 | 4/1998 |
| JP | 10-136480 | 5/1998 |
| JP | H10-200608 | 7/1998 |
| JP | 10-227 U | 9/1998 |
| JP | H11-112672 | 4/1999 |
| JP | H11-163980 A | 6/1999 |
| JP | 3064055 U | 9/1999 |
| JP | 11-298595 | 10/1999 |
| JP | H11-352138 | 12/1999 |
| JP | 2000-013294 | 1/2000 |
| JP | 2000-031858 | 1/2000 |
| JP | 2000-49935 | 2/2000 |
| JP | 3070222 U | 4/2000 |
| JP | 2000/217015 A | 8/2000 |
| JP | 2000-295696 | 10/2000 |
| JP | 2000-322186 | 11/2000 |
| JP | 2000-324217 | 11/2000 |
| JP | 2001125742 | 5/2001 |
| JP | 2001-177809 | 6/2001 |
| JP | 2001169016 | 6/2001 |
| JP | 2001-268211 | 9/2001 |
| JP | 2001-287183 A | 10/2001 |
| JP | 2001287183 | 10/2001 |
| JP | 2001-320790 | 11/2001 |
| JP | 2001-333161 A | 11/2001 |
| JP | 2001-339504 | 12/2001 |
| JP | 2001-352395 | 12/2001 |
| JP | 2002-016720 | 1/2002 |
| JP | 2002-036158 A | 2/2002 |
| JP | 2002-041411 A | 2/2002 |
| JP | 2002-051111 | 2/2002 |
| JP | 2002036158 | 2/2002 |
| JP | 2002041411 | 2/2002 |
| JP | 2002-84575 | 3/2002 |
| JP | 2002-111822 A | 4/2002 |
| JP | 2002-149312 | 5/2002 |
| JP | 2002-164986 A | 6/2002 |
| JP | 2002-171321 A | 6/2002 |
| JP | 2002-223475 | 8/2002 |
| JP | 2002-238262 A | 8/2002 |
| JP | 2002-262377 | 9/2002 |
| JP | 3090729 U | 10/2002 |
| JP | 2002-359889 A | 12/2002 |
| JP | 2002-368839 | 12/2002 |
| JP | 2003-032768 | 1/2003 |
| JP | 2003032343 | 1/2003 |
| JP | 2003-037651 | 2/2003 |
| JP | 2003-102094 | 4/2003 |
| JP | 2003-103220 A | 4/2003 |
| JP | 2003-111175 A | 4/2003 |
| JP | 2003-125473 A | 4/2003 |
| JP | 2003101625 | 4/2003 |
| JP | 2003-143253 | 5/2003 |
| JP | 2003-145048 | 5/2003 |
| JP | 2003-169115 | 6/2003 |
| JP | 2003-173375 A | 6/2003 |
| JP | 2003-179988 | 6/2003 |
| JP | 2003-188985 | 7/2003 |
| JP | 2003-198719 | 7/2003 |
| JP | 2003-211087 | 7/2003 |
| JP | 2003-218989 | 7/2003 |
| JP | 2003-274376 | 9/2003 |
| JP | 2003-274470 | 9/2003 |
| JP | 2003-300015 | 10/2003 |
| JP | 2003-304308 | 10/2003 |
| JP | 2003-319022 | 11/2003 |
| JP | 2003-348208 | 12/2003 |
| JP | 2004-064457 | 2/2004 |
| JP | 2004-094389 | 3/2004 |
| JP | 2004-128915 | 4/2004 |
| JP | 2004-157873 | 6/2004 |
| JP | 2004-158961 A | 6/2004 |
| JP | 2004-173018 A | 6/2004 |
| JP | 2004-173264 | 6/2004 |
| JP | 2004-187031 | 7/2004 |
| JP | 2004-205839 | 7/2004 |
| JP | 2004190699 | 7/2004 |
| JP | 2004208220 | 7/2004 |
| JP | 2004233316 | 8/2004 |
| JP | 2004-252626 | 9/2004 |
| JP | 2004-266321 A | 9/2004 |
| JP | 2004-274438 | 9/2004 |
| JP | 2004-357198 | 12/2004 |
| JP | 2005-020234 | 1/2005 |
| JP | 2005-020730 | 1/2005 |
| JP | 2005-311125 | 4/2005 |
| JP | 2005-512440 A | 4/2005 |
| JP | 2005-142835 | 6/2005 |
| JP | 2005-159969 | 6/2005 |
| JP | 2005142729 | 6/2005 |
| JP | 2005-184267 | 7/2005 |
| JP | 2005-223717 A | 8/2005 |
| JP | 2005/229324 | 8/2005 |
| JP | 2005-229324 | 8/2005 |
| JP | 2005-237026 | 9/2005 |
| JP | 2005-244968 | 9/2005 |
| JP | 2005-328125 A | 11/2005 |
| JP | 2005-534269 | 11/2005 |
| JP | 2005-340927 | 12/2005 |
| JP | 2005-341543 | 12/2005 |
| JP | 2005-348193 | 12/2005 |
| JP | 2005-352024 | 12/2005 |
| JP | 2006-007342 A | 1/2006 |
| JP | 2006-007919 | 1/2006 |
| JP | 2006-011591 A | 1/2006 |
| JP | 2006-019812 | 1/2006 |
| JP | 2006005625 | 1/2006 |
| JP | 2006007342 | 1/2006 |
| JP | 2006-050056 A | 2/2006 |
| JP | 2006-051300 | 2/2006 |
| JP | 2006-066972 A | 3/2006 |
| JP | 2006-067049 | 3/2006 |
| JP | 2006-074671 A | 3/2006 |
| JP | 2006-086581 | 3/2006 |
| JP | 2006-109326 | 4/2006 |
| JP | 2006-115060 | 4/2006 |
| JP | 2006-115476 | 4/2006 |
| JP | 2006094158 | 4/2006 |
| JP | 2006-129117 | 5/2006 |
| JP | 2006-129404 | 5/2006 |
| JP | 2006-148295 | 6/2006 |
| JP | 2006-155734 | 6/2006 |
| JP | 2006-157318 | 6/2006 |
| JP | 2006-165702 | 6/2006 |
| JP | 2006-166128 | 6/2006 |
| JP | 2006-166300 | 6/2006 |
| JP | 2006-186691 A | 7/2006 |
| JP | 2006-197404 | 7/2006 |
| JP | 2006197267 | 7/2006 |
| JP | 2006-211317 | 8/2006 |
| JP | 2006-217321 | 8/2006 |
| JP | 2006-226506 | 8/2006 |
| JP | 2006-229647 A | 8/2006 |
| JP | 2006217088 | 8/2006 |
| JP | 2006-238072 | 9/2006 |
| JP | 2006-283541 | 10/2006 |
| JP | 2006-295786 | 10/2006 |
| JP | 2006303618 | 11/2006 |
| JP | 2006-333058 | 12/2006 |

(56) References Cited

FOREIGN PATENT DOCUMENTS

| | | |
|---|---|---|
| JP | 2006-339914 | 12/2006 |
| JP | 2006-345025 A | 12/2006 |
| JP | 2006-345471 | 12/2006 |
| JP | 2006333058 | 12/2006 |
| JP | 2007-003702 | 1/2007 |
| JP | 2007-006369 | 1/2007 |
| JP | 2007/010518 | 1/2007 |
| JP | 2007-019898 | 1/2007 |
| JP | 2007-019957 | 1/2007 |
| JP | 2007-020051 | 1/2007 |
| JP | 2007-028469 | 2/2007 |
| JP | 2007-051007 | 3/2007 |
| JP | 2007-051395 A | 3/2007 |
| JP | 2007-072015 | 3/2007 |
| JP | 2007-074663 | 3/2007 |
| JP | 2007-081276 | 3/2007 |
| JP | 2007-096386 | 4/2007 |
| JP | 2007-103989 | 4/2007 |
| JP | 2007-104548 | 4/2007 |
| JP | 2007-104603 A | 4/2007 |
| JP | 2007-129740 A | 5/2007 |
| JP | 2007-133698 | 5/2007 |
| JP | 2007-142920 | 6/2007 |
| JP | 2007-165938 | 6/2007 |
| JP | 2007-180827 | 7/2007 |
| JP | 2007-189578 | 7/2007 |
| JP | 2007-195239 | 8/2007 |
| JP | 2007-214883 | 8/2007 |
| JP | 2007-228508 | 9/2007 |
| JP | 2007-268028 A | 10/2007 |
| JP | 2007-275819 | 10/2007 |
| JP | 2007281916 | 10/2007 |
| JP | 2007-306465 | 11/2007 |
| JP | 2007-307124 | 11/2007 |
| JP | 2007-330560 A | 12/2007 |
| JP | 2007-336418 | 12/2007 |
| JP | 2008-000709 | 1/2008 |
| JP | 2008-006558 A | 1/2008 |
| JP | 2008-017327 | 1/2008 |
| JP | 2008-017398 | 1/2008 |
| JP | 2008006558 | 1/2008 |
| JP | 2008-042324 A | 2/2008 |
| JP | 2008-046844 | 2/2008 |
| JP | 2008-085417 | 4/2008 |
| JP | 2008-092164 | 4/2008 |
| JP | 2008-092313 | 4/2008 |
| JP | 2008-511217 | 4/2008 |
| JP | 2008-121796 | 5/2008 |
| JP | 2008-135991 | 6/2008 |
| JP | 2008-141589 | 6/2008 |
| JP | 2008-141687 | 6/2008 |
| JP | 2008-148086 | 6/2008 |
| JP | 2008-149427 A | 7/2008 |
| JP | 2008-153783 | 7/2008 |
| JP | 2008-177629 | 7/2008 |
| JP | 2008-177705 | 7/2008 |
| JP | 2008149427 | 7/2008 |
| JP | 3144392 U | 8/2008 |
| JP | 2008-227123 | 9/2008 |
| JP | 2008-227806 | 9/2008 |
| JP | 2008-229531 | 10/2008 |
| JP | 2008-263383 | 10/2008 |
| JP | 2008-301071 | 12/2008 |
| JP | 2009-010593 | 1/2009 |
| JP | 2009-044510 | 2/2009 |
| JP | 2009-077260 | 4/2009 |
| JP | 2009-094986 A | 4/2009 |
| JP | 2009088942 | 4/2009 |
| JP | 2009-117953 | 5/2009 |
| JP | 2009-118396 | 5/2009 |
| JP | 2009111820 | 5/2009 |
| JP | 2009-147680 | 7/2009 |
| JP | 2009-159402 | 7/2009 |
| JP | 2009-159577 | 7/2009 |
| JP | 2009-166213 A | 7/2009 |
| JP | 2009166213 | 7/2009 |
| JP | 2009171249 | 7/2009 |
| JP | 4307488 | 8/2009 |
| JP | 2009-207056 | 10/2009 |
| JP | 2009-232443 | 10/2009 |
| JP | 2009-246954 | 10/2009 |
| JP | 2009246954 | 10/2009 |
| JP | 2009-260883 | 11/2009 |
| JP | 2009-542038 | 11/2009 |
| JP | 2009267616 | 11/2009 |
| JP | 2010-010945 A | 1/2010 |
| JP | 2010-011117 | 1/2010 |
| JP | 2010-054731 | 3/2010 |
| JP | 2010-068299 | 3/2010 |
| JP | 2010-087810 | 4/2010 |
| JP | 2010-094799 | 4/2010 |
| JP | 2010-094799 A | 4/2010 |
| JP | 2010-109795 | 5/2010 |
| JP | 2010-124287 | 6/2010 |
| JP | 2010-147727 | 7/2010 |
| JP | 2010-166406 | 7/2010 |
| JP | 2010-524295 | 7/2010 |
| JP | 4541111 | 7/2010 |
| JP | 2010-528547 | 8/2010 |
| JP | 2010-207963 A | 9/2010 |
| JP | 2010207963 | 9/2010 |
| JP | 2010-232755 | 10/2010 |
| JP | 2010245854 | 10/2010 |
| JP | 2010-258701 | 11/2010 |
| JP | 2010-268336 | 11/2010 |
| JP | 2010-283541 | 12/2010 |
| JP | 2011-004195 A | 1/2011 |
| JP | 2011-008503 A | 1/2011 |
| JP | 2011-010791 A | 1/2011 |
| JP | 2011-015193 | 1/2011 |
| JP | 2011-017969 | 1/2011 |
| JP | 2011-035560 A | 2/2011 |
| JP | 2011-048697 | 3/2011 |
| JP | 2011-053744 | 3/2011 |
| JP | 2011-059376 | 3/2011 |
| JP | 2011-087142 A | 4/2011 |
| JP | 2011-512745 | 4/2011 |
| JP | 2011-130334 | 6/2011 |
| JP | 2011-135489 | 7/2011 |
| JP | 2011-139439 | 7/2011 |
| JP | 2011-139462 | 7/2011 |
| JP | 2011-212167 A | 10/2011 |
| JP | 2011-223556 | 11/2011 |
| JP | 2011-223824 A | 11/2011 |
| JP | 2011-233971 | 11/2011 |
| JP | 2011-234323 A | 11/2011 |
| JP | 2012-508499 A | 4/2012 |
| JP | 2012-109663 | 6/2012 |
| JP | 2012-138770 | 7/2012 |
| JP | 2012-515574 A | 7/2012 |
| JP | 2012142679 | 7/2012 |
| JP | 2012-156781 | 8/2012 |
| JP | 2012150266 | 8/2012 |
| JP | 2012-169817 | 9/2012 |
| JP | 2012-178695 A | 9/2012 |
| JP | 2012-249097 | 12/2012 |
| JP | 2012-257072 | 12/2012 |
| JP | 2013-005212 | 1/2013 |
| JP | 2013-055492 A | 3/2013 |
| JP | 2013-061176 | 4/2013 |
| JP | 2013-078116 | 4/2013 |
| JP | 2013-081047 A | 5/2013 |
| JP | 2013105272 | 5/2013 |
| JP | 2013115638 | 6/2013 |
| JP | 2013-128896 A | 7/2013 |
| JP | 2013130402 | 7/2013 |
| JP | 2013-198072 A | 9/2013 |
| JP | 2013-201560 | 10/2013 |
| JP | 2013-235316 A | 11/2013 |
| JP | 2013-255091 A | 12/2013 |
| JP | 2013-255212 A | 12/2013 |
| JP | 2013255091 | 12/2013 |
| JP | 2013255212 | 12/2013 |
| JP | 2014-003488 A | 1/2014 |

(56) References Cited

FOREIGN PATENT DOCUMENTS

| | | |
|---|---|---|
| JP | 2014003488 | 1/2014 |
| JP | 2014-089494 A | 5/2014 |
| JP | 2014-116972 | 6/2014 |
| JP | 2014-190965 | 10/2014 |
| JP | 2014-229991 A | 12/2014 |
| JP | 5676003 | 2/2015 |
| JP | 2015-061285 | 3/2015 |
| JP | 2015082818 | 4/2015 |
| JP | 2015-084801 A | 5/2015 |
| JP | 2015084801 | 5/2015 |
| JP | 2015-139132 | 7/2015 |
| KR | 970008927 | 5/1997 |
| KR | 10-1998-0022845 | 6/1998 |
| KR | 10-2005-0086378 | 8/2005 |
| KR | 10-2007-0109323 | 11/2007 |
| KR | 10-2008-0006514 | 1/2008 |
| KR | 10-2008-0009602 | 1/2008 |
| KR | 10-2008-0040962 | 5/2008 |
| KR | 10-2009-0033564 | 4/2009 |
| KR | 10-2009-0120951 | 11/2009 |
| KR | 10-2010-0034906 | 4/2010 |
| KR | 10-2010-0041386 | 4/2010 |
| TW | 200423682 | 11/2004 |
| TW | 200536415 A | 11/2005 |
| TW | 200539664 A | 12/2005 |
| TW | I391880/200912814 | 3/2009 |
| TW | 200922261 A | 5/2009 |
| TW | 201018982 | 5/2010 |
| TW | M452360 U | 5/2013 |
| TW | 201342313 | 10/2013 |
| WO | 199805148 | 2/1998 |
| WO | 2003/055183 | 7/2003 |
| WO | 2004/034734 | 4/2004 |
| WO | 2005/067339 | 7/2005 |
| WO | 2005/069586 | 7/2005 |
| WO | 2005/091670 | 9/2005 |
| WO | 2005/096599 | 10/2005 |
| WO | 2005/096664 | 10/2005 |
| WO | 2006/006313 A1 | 1/2006 |
| WO | 2006-021133 | 3/2006 |
| WO | 2006/028045 A1 | 3/2006 |
| WO | 2006/075440 | 7/2006 |
| WO | 2007/034739 | 3/2007 |
| WO | 2007-099707 | 9/2007 |
| WO | 2008/007666 | 1/2008 |
| WO | 2008/029515 | 3/2008 |
| WO | 2009/104437 | 8/2009 |
| WO | 2009/133873 | 11/2009 |
| WO | 2009/136498 | 11/2009 |
| WO | 2009/141912 | 11/2009 |
| WO | 2010-005045 | 1/2010 |
| WO | 2010/050154 | 5/2010 |
| WO | 2010/060323 | 6/2010 |
| WO | 2010/116510 | 10/2010 |
| WO | 2010140087 | 12/2010 |
| WO | 2011/007679 | 1/2011 |
| WO | 2011/023672 A1 | 3/2011 |
| WO | 2011/090944 | 7/2011 |
| WO | 2011/121740 | 10/2011 |
| WO | 2011/153165 | 12/2011 |
| WO | 2011/159349 | 12/2011 |
| WO | 2002/021881 | 3/2012 |
| WO | 2012/090947 | 7/2012 |
| WO | 2012/097314 | 7/2012 |
| WO | 2012/114917 | 8/2012 |
| WO | 2012114772 | 8/2012 |
| WO | 2013/047609 | 4/2013 |
| WO | 2013/121631 | 8/2013 |
| WO | 2013/168628 | 11/2013 |
| WO | 2014/156534 | 10/2014 |
| WO | 2015/122879 | 8/2015 |

OTHER PUBLICATIONS

Smartphone Black Berry Bold 9700, Operation guide (2010).
Office Action for JP Patent Application No. 2016-013411 dated Nov. 22, 2016 with English Translation.
Office Action for KR Patent Application No. 10-2016-7004740 dated Nov. 28, 2016 with English Translation.
Office Action for JP Patent Application No. 2012-252203 dated Dec. 20, 2016 with English Translation.
Office Action for JP Patent Application No. 2012-243480 dated Dec. 20, 2016 with English Translation.
Office Action for JP Patent Application No. 2012-229176 dated Dec. 27, 2016 with English Translation.
Office Action for JP Patent Application No. 2012-268649 dated Jan. 31, 2017 with English Translation.
Office Action for JP Patent Application No. 2012-054308 dated Feb. 7, 2017 with English Translation.
Final Office Action for JP Patent Application No. 2012-120173 dated Feb. 7, 2017 with English translation.
U.S. Patent and Trademark Office, Office Action in U.S. Appl. No. 15/049,403 dated Nov. 23, 2016.
U.S. Patent and Trademark Office, Office Action in U.S. Appl. No. 15/174,746 dated Nov. 25, 2016.
European Patent Office, Partial Search Report for EP 11 85 3443 dated Oct. 27, 2016.
Japanese Patent Office, official communication in Japanese Patent Application No. 2012-054308 dated Jun. 7, 2016 (and machine translation).
Japanese Patent Office, official communication in Japanese Patent Application No. 2015-056466 dated Jul. 12, 2016 (and machine translation).
Japanese Patent Office, official communication in Japanese Patent Application No. 2015-217427 dated Jul. 19, 2016 (and machine translation).
Japanese Patent Office, official communication in Japanese Patent Application No. 2015-217421 dated Jul. 19, 2016 (and machine translation).
SIPO of People's Republic of China, official communication for Chinese Patent Application No. 201180031904.5 dated Jul. 20, 2016 (and machine translation).
Japanese Patent Office, official communication in Japanese Patent Application No. 2012-120173 dated Jul. 26, 2016 (and machine translation).
Japanese Patent Office, official communication in Japanese Patent Application No. 2015-048052 dated Aug. 2, 2016 (and machine translation).
Japanese Patent Office, official communication in Japanese Patent Application No. 2012-147753 dated Aug. 23, 2016 (and machine translation).
Japanese Patent Office, official communication in Japanese Patent Application No. 2015-231478 dated Aug. 30, 2016 (and machine translation).
News Release, "New Offer of Smartphone Using Cartilage Conduction", Rohm Semiconductor, Kyoto, Japan, Apr. 23, 2012 (with English translation).
Japanese Office Action in Japanese Application No. 2016-051347, dated Feb. 14, 2017, 6 pages (English Translation).
Korean Office Action in Korean Application No. 10-2015-7005518, dated Mar. 20, 2017, 12 pages (English Translation).
Japanese Office Action in Japanese Application No. 2015-217421, dated Feb. 28, 2017, 6 pages (English Translation).
Japanese Office Action in Japanese Application No. 2013-028997, dated Mar. 21, 2017, 8 pages (English Translation).
International Search Report for International Application No. PCT/JP2017/000787, dated Mar. 28, 2017, 1 page.
Japanese Office Action in Japanese Application No. 2016-087027, dated Mar. 28, 2017, 9 pages (English Translation).
Japanese Office Action in Japanese Application No. 2016-097777, dated Mar. 21, 2017, 8 pages (English Translation).
Japanese Patent Office, International Search Report for International Patent Application PCT/JP2012/053231 (dated Mar. 13, 2012).
Japanese Patent Office, International Search Report for PCT/JP2013/067781 dated Oct. 1, 2013 (with English translation).

(56) References Cited

OTHER PUBLICATIONS

Japanese Patent Office, International Search Report for International Patent Application PCT/JP2012/066376 (dated Oct. 30, 2012).
International Search Report for International Patent Application PCT/JP2011/080095 (dated Apr. 3, 2012).
Taiwanese Patent Office, search report in application 100148983 (2 pages) (dated Jan. 17, 2013).
U.S. Patent and Trademark Office, Office Action in U.S. Appl. No. 13/556,367 (dated Oct. 19, 2012).
European Patent Office, official communication in Application No. EP 11 85 3718 (dated May 14, 2014).
U.S. Patent and Trademark Office, Office Action in U.S. Appl. No. 13/489,971 (dated Oct. 24, 2012).
Isaka et al., "Development of Bone Conduction Speaker by Using Piezoelectric Vibration," The Japan Society of Mechanical Engineers (No. 04-5) Dynamics and Design Conference 2004 CD-ROM Compilation (Sep. 27-30, 2004; Tokyo) (and English translation).
Extended European Search Report in European patent application No. 12866397.8 (dated Jul. 20, 2015).
Japanese Patent Office, International Search Report for PCT/JP2014/071607 dated Nov. 11, 2014 (with English translation).
Japan Patent Office, International Search Report for PCT/JP2014/077792 dated Dec. 16, 2014 (with English translation).
Extended European Search Report for PCTJP2013067781 dated Feb. 19, 2016.
Office Action for corresponding Japanese Patent Application No. 2016-185559 dated Jul. 25, 2017 (with English translation).
Office Action for corresponding Japanese Patent Application No. 2016-195560 dated Aug. 22, 2017 (with English translation).
Office Action for corresponding Japanese Patent Application No. 2016-197219 dated Aug. 22, 2017 (with English translation).
Office Action for corresponding Japanese Patent Application No. 2016-197225 dated Aug. 22, 2017 (with English translation).
Office Action for corresponding Japanese Patent Application No. 2013-186424 dated Sep. 26, 2017_with English translation.
Office Action for corresponding Japanese Patent Application No. 2013-195756 dated Sep. 26, 2017 (with English translation).
Office Action for corresponding Japanese Patent Application No. 2013-173595 dated Oct. 10, 2017 (with English translation).
Fukumoto, M. and Sugimura, T., Fulltime-wear Interface Technology , NTT Technical Review, 8(1):77-81, (2003) (with English Translation).
Sasaki C, Crusoe Supplementary Class note Which Condensed the Function Called for, ASCII, 12 pages (2001) (partial English translation).
Office Action mailed for KR Patent Application No. 10-2017-7019074 dated Oct. 13, 2017 with English Translation.
Office Action mailed for Japanese Patent Application No. 2013-227279 dated Oct. 17, 2017 with English translation.
Office Action for Japanese Patent Application No. 2013-221303 dated Oct. 17, 2017 with English Translation.
Office Action for Japanese Patent Application No. 2013-237963 dated Nov. 7, 2017 with English Translation.
Office Action for Japanese Application No. 2017-004233 dated Nov. 21, 2017 with English Translation.
Office Action for Japanese Patent Application No. 2016-236604 dated Nov. 21, 2017 with English Translation.
Office Action for Japanese Patent Application No. 2014-010271 dated Nov. 28, 2017 with English Translation.
Office Action for Japanese Patent Application No. 2017-000580 dated Dec. 19, 2017 with English Translation.
Office Action for Korean Application No. 10-2016-7004740 dated Dec. 19, 2017 with English Translation.
Office Action for Japanese Patent Application No. 2013-221303 dated Dec. 26, 2017 with English Translation.
Office Action for Japanese Patent Application No. 2013-237963 dated Dec. 26, 2017 with English Translation.
Japan Patent Office, International Search Report for PCT/JP2016/070848 dated Sep. 6, 2016, with English translation.
Chinese Office Action in Chinese Application No. 201510148247.2, dated May 3, 2017, 39 pages English Translation.
Japanese Office Action in Japanese Application No. 2016-114221, dated Jun. 13, 2017, English Translation.
Japanese Office Action in Japanese Application No. 2012-150941, dated May 9, 2017, English Translation.
Shimomura et al., "Vibration and Acoustic Characteristics of Cartilage Transducer," Acoustical Society of Japan, 2010 with Partial English Translation.
Rion Co. Ltd., "New-generation Vibration Level Meter Model VM-51," Acoustical Society of Japan, 1990 with Partial English Translation.
Japanese Office Action in Japanese Application No. 2013-106416, dated May 30, 2017, English Translation.
Japanese Office Action in Japanese Application No. 2012-197484, dated Jun. 13, 2017, English Translation.
Japanese Office Action in Japanese Application No. 2013-126623, dated Jun. 13, 2017, English Translation.

* cited by examiner

HEARING SYSTEM AND FINGER RING FOR THE HEARING SYSTEM

TECHNICAL FIELD

The present invention relates to a hearing system using cartilage conduction and to a finger ring for the hearing system.

BACKGROUND ART

A patent document 1 proposes, as a method for using a bone conduction speaker that includes a vibration surface pressurized to a tragus to adjust, by means of a manual operation, a pressure between the vibration surface and the tragus pressurized against the vibration surface, thereby changing a transmission ratio of voice information due to cartilage conduction and voice information due to air conduction in accordance with a size of an external noise.

CITATION LIST

Patent Literature

PLT1: JP-4541111

SUMMARY OF INVENTION

Technical Problem

However, to boost usefulness of a hearing system that uses the cartilage conduction, there are many issues to be further studied.

In light of the above issues found by the inventors of the present application, it is an object of the present invention to provide: a useful hearing system that uses the cartilage conduction; and a finger ring for the hearing system.

Solution to Problem

To achieve the above object, a hearing system according to the present invention is a hearing system that comprises a finger ring and a hearing device main body and has a structure (1st structure), in which the finger ring includes: a first short-distance wireless communication portion; a vibration output portion disposed at a position that contacts a finger to convert a voice signal, which is received by the first short-distance wireless communication portion, into a cartilage conduction vibration and outputs the cartilage conduction vibration; and a first power source portion that performs electric power supply to the first short-distance wireless communication portion and the vibration output portion; and the hearing device main body includes: a second short-distance wireless communication portion that performs wireless communication with the first short-distance wireless communication portion; a microphone; a voice signal output portion that makes the second short-distance wireless communication portion output the voice signal according to a voice captured by the microphone; and a second power source portion that performs electric power supply to the second short-distance wireless communication portion, the microphone, and the voice signal output portion.

In the meantime, in the hearing system having the 1st structure, a structure (2nd structure) may be employed, in which the vibration output portion outputs the cartilage conduction vibration transmittable to an ear cartilage via a finger when the finger contacts the ear cartilage.

Besides, in the hearing system having the 1st structure, a structure (3rd structure) may be employed, in which the finger ring further includes a power-source switch that turns on/off a power source of the first power source portion; and wherein the second power source portion is remotely controlled in accordance with an on/off-state of the power-source switch that is transmitted from the first short-distance wireless communication portion via the second short-distance wireless communication portion.

Besides, the hearing system according to the present invention is a hearing system that comprises the finger ring and the hearing device main body, and has a structure (4th structure), in which the finger ring includes: a power-source switch that turns on/off a power source; a first short-distance wireless communication portion that transmits an on/off-state of the power-source switch; and a first power source portion that performs electric power supply to the first short-distance wireless communication portion, and the hearing device main body includes: a second short-distance wireless communication portion that performs wireless communication with the first short-distance wireless communication portion; a microphone; a voice signal output portion that outputs a voice captured by the microphone as a hearing device voice; and a second power source portion that is remotely controlled in accordance with the on/off-state of the power-source switch, which is transmitted from the first short-distance wireless communication portion via the second short-distance wireless communication portion, and performs electric power supply to the microphone and the voice signal output portion.

Besides, the finger ring for the hearing system according to the present invention is a finger ring used for the talk system, and has a structure (5th structure), which includes: a short-distance wireless communication portion; a vibration output portion disposed at a position that contacts a finger to convert a voice signal, which is received by the short-distance wireless communication portion, into a cartilage conduction vibration and outputs the cartilage conduction vibration; and a power source portion that performs electric power supply to the short-distance wireless communication portion and the vibration output portion.

In the meantime, the finger ring having the 5th structure may be structured (6th structure) to further include a power-source switch that turns on/off a power source of the power source portion; wherein the short-distance wireless communication portion outputs an on/off-state of the power source portion to outside.

Besides, in the finger ring having the 6th structure, a structure (7th structure) may be employed, in which the power-source switch includes a self-holding function that holds the on-state for a predetermined self-time span; and wherein count operation during the self-holding time span is reset at each turning-on operation of the power source portion and restarted.

Besides, in the finger ring having the 5th structure, a structure (8th structure) may be employed, in which the vibration output portion includes a piezoelectric bimorph; and wherein the power source portion includes a voltage step-up circuit that drives the piezoelectric bimorph.

Besides, in the finger ring having the 5th structure, a structure (9th structure) may be employed, in which the vibration output portion includes an electromagnetic vibration portion.

Besides, in the finger ring having the 5th structure, a structure (10th structure) may be employed, in which the hearing system is a hearing aid system.

Besides, the finger ring having the 5th structure may be structured (11th structure) to further include a microphone.

Besides, in the finger ring having the 5th structure, a structure (12th structure) may be employed, in which the hearing system is for a mobile phone system.

Besides, the finger ring having the 12th structure may be structured (13th structure) to further include a control portion that receives an incoming alert signal via the short-distance wireless communication portion to make the power source portion start the electric power supply.

Besides, the finger ring having the 13th structure may be structured (14th structure) to further include an incoming aleart vibration portion that notifies a phone call based on the incoming alert signal.

Besides, in the finger ring having the 14th structure, a structure (15th structure) may be employed, in which the vibration output portion doubles as the incoming alert vibration portion.

Besides, the finger ring having the 12th structure may be structured (16th structure) to further include a manual operation switch; wherein the short-distance wireless communication portion outputs a signal corresponding to a call/answer operation by the manual switch to the mobile phone.

Besides, in the finger ring having the 12th structure, a structure (17th structure) may be employed, in which the vibration output portion includes a piezoelectric bimorph; and wherein the power source portion includes a voltage step-up circuit that drives the piezoelectric bimorph.

Besides, in the finger ring having the 12th structure, a structure (18th structure) may be employed, in which the vibration output portion includes an electromagnetic vibration portion.

Besides, in the finger ring having the 5th structure, a structure (19th structure) may be employed, in which the vibration output portion outputs the cartilage conduction vibration that is transmittable to an ear cartilage via a finger when the finger contacts the ear cartilage.

Besides, in the finger ring having the 19th structure, a structure (20th structure) may be employed, in which the ear cartilage is of a tragus.

Advantageous Effects of Invention

According to the present invention, it is possible to provide a useful hearing system that uses the cartilage conduction.

DESCRIPTION OF EMBODIMENTS

<Whole Picture of System>

Figure 1:
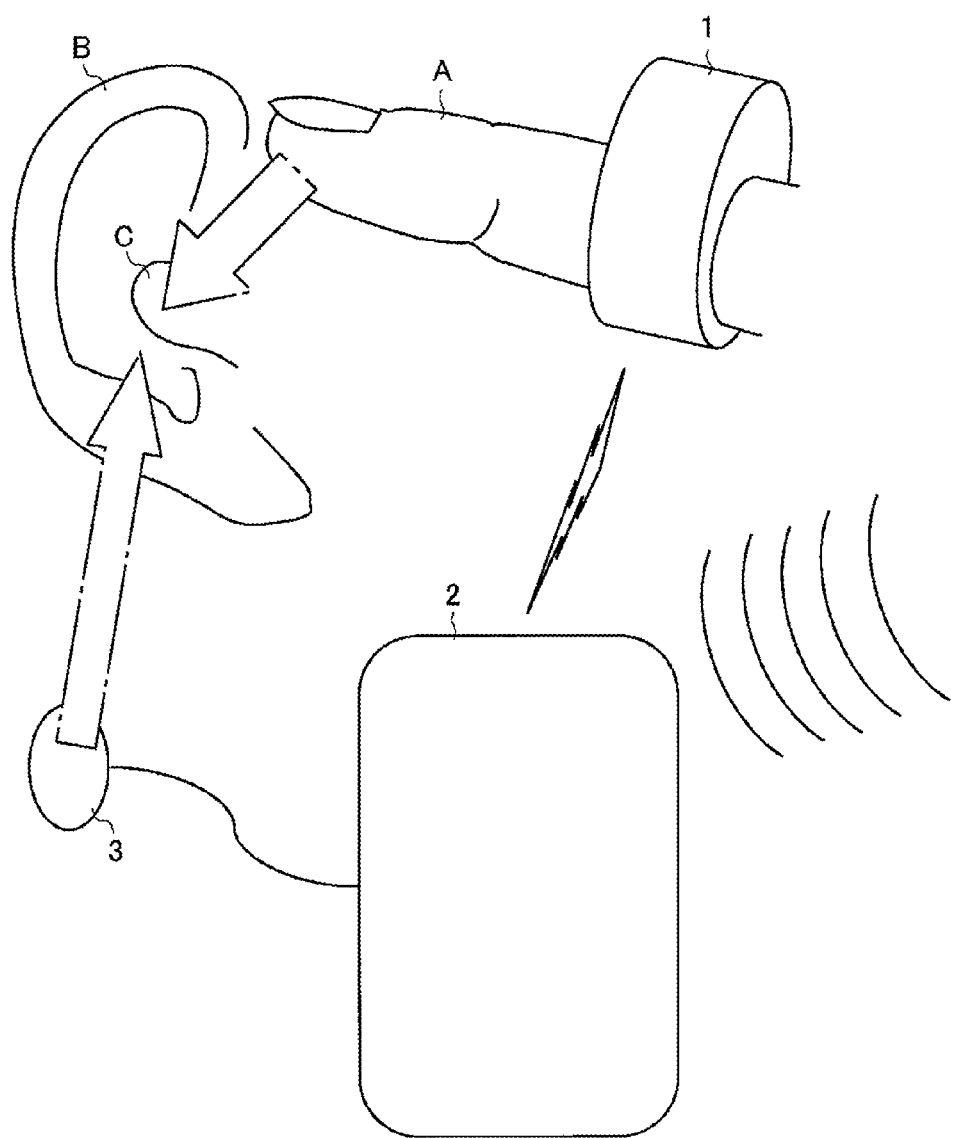
FIG. 1 is a schematic view showing schematically a whole picture of a hearing system according to the present invention.

FIG. 1 is a schematic view showing schematically a whole picture of a hearing system according to the present invention. The hearing system (hearing aid system, mobile phone system and the like) according to the present invention has: a finger ring 1; a hearing device main body 2; and an ear piece 3. FIG. 1 shows a structure (of first to fourth embodiments described later, a structure according to the first embodiment (FIG. 2) and the third embodiment (FIG. 4) especially) in which the finger ring 1 and the hearing device main body 2 are disposed separately from each other. In the meantime, when the finger ring 1 is going to be used, the ear piece 3 is demounted from the hearing device main body 2, accordingly, usually, the finger ring 1 and the ear piece 3 are not expected to be used concurrently.

The finger ring 1 is mounted on a finger A (e.g., a third joint) of a user, converts a voice signal input from the hearing device main body 2 into a cartilage conduction vibration, and transmits the cartilage conduction vibration to the finger A. With the cartilage conduction vibration transmitted to the finger A, if the user pressurizes the finger A against a cartilage C (hereinafter, called an ear cartilage C) near an ear B, the cartilage conduction vibration generated by the finger ring 1 is transmitted to the ear cartilage C. As a result of this, the voice signal from the hearing device main body 2 travels as a cartilage conduction sound to a cartilage around an external auditory canal, is transmitted to an eardrum by air transmission occurring in the external auditory canal and part of it is directly transmitted to an inner ear via the cartilage. In the meantime, the example of the ear cartilage which is the pressurization target of the finger A is a cartilage which includes a tragus and is situated around an entrance portion of the external auditory canal. The pressurization target of the finger A is not limited to this, and various ear cartilage parts may be used; however, the cartilage around the entrance portion of the external auditory canal including the tragus is effective to generate an air transmission sound in the external auditory canal based on the cartilage conduction and the ear hole is generally recognized as a part to hear a sound, and is a preferred part to trigger an unconscious action of pressurizing the finger A against the ear. Besides, according to this action, when pressuring the finger A against the entrance portion of the external auditory canal, the finger A naturally hits the protruding tragus, accordingly, especially, the tragus draws attention as a contact portion. Further, the tragus has a structure to close the ear hole when pushed, accordingly, is preferable to obtain an earplug bone conduction effect described later. In the meantime, the structure and operation of the finger ring 1 are described in detail later.

The hearing device main body 2 is carried (in a breast pocket and the like) by the user and transmits a voice signal to the finer ring 1 and the ear piece 3. For example, in a case where the hearing system according to the present invention is a hearing aid system, the hearing aid main body serves as the hearing device main body 2, and a voice detected by a microphone is converted into an electric signal and transmitted to the finger ring 1 and the ear piece 3. Besides, in a case where the hearing system according to the present invention is a mobile phone system, the mobile phone main body serves as the hearing device main body 2, and a voice signal received via a telephone line is transmitted to the finger ring 1 and the ear piece 3. In the meantime, the structure and operation of the hearing device main body 2 are described in detail later.

The ear piece 3 is an acoustic small-sized speaker that converts the voice signal input from the hearing device main body 2 into an air vibration. Accordingly, if the ear piece 3 is mounted on the ear B, the voice signal from the hearing device main body 2 is transmitted as an air conduction sound to an auditory nerve (inner ear) via the eardrum (middle ear).

The hearing system according to the present invention is usable, for example, as a preferred hearing aid system for a user who is becoming a little hard of hearing. The user of this hearing aid system does not usually mount the ear piece 3 onto the ear B, but pressurizes temporarily the finger A against the ear cartilage C only in a case where the hearing aid is needed (e.g., a case where the other person's voice is low or far), whereby it becomes possible to aid the hearing of the voice by using the cartilage conduction. In the meantime, the action of pressurizing the finger A against the ear cartilage C resembles a natural action of hearing the other person's voice, which accordingly does not give a strange feeling to the user, the other person and people around. Besides, by increasing the pressurization force of the finger A to close the external auditory canal by means of the tragus and the like or to close directly the external auditory canal by means of the finger tip, it also becomes possible to increase the hearing capability thanks to the so-called earplug bone conduction effect. In the meantime, the hearing device main body 2 is structured to aid the hearing in the same way as an existing hearing aid system if connected when the user wants to mount the ear piece 3 onto the ear B.

As described above, according to the hearing aid system that includes the finger ring 1 for transmitting the cartilage conduction vibration to the ear cartilage C via the finger A, the user can enjoy daily life without mounting the uncomfortable ear piece 3 as long as the hearing aid is not needed. Besides, in the case where the hearing aid is needed, the user can speedily aid the hearing of the voice thanks to the natural action of pressurizing the finger A against the ear cartilage C. Besides, the finger ring 1 is mounted on the finger A, accordingly, causes less uncomfortable feeling than the ear piece 3 mounted on the ear B, and it also becomes possible to dramatically reduce a physical burden or a mental burden on the user.

In the meantime, FIG. 1 shows, as an example, the structure in which the finger ring 1 and the hearing device main body 2 are disposed separately from each other; however, the structure of the present invention is not limited to this, and the function of the hearing device main body 2 may be suitably built in the finger ring 1. As to these variations, of first to fourth embodiments described hereinafter, the second embodiment (FIG. 3) and the fourth embodiment (FIG. 5) are especially described in detail.

First Embodiment

Figure 2:
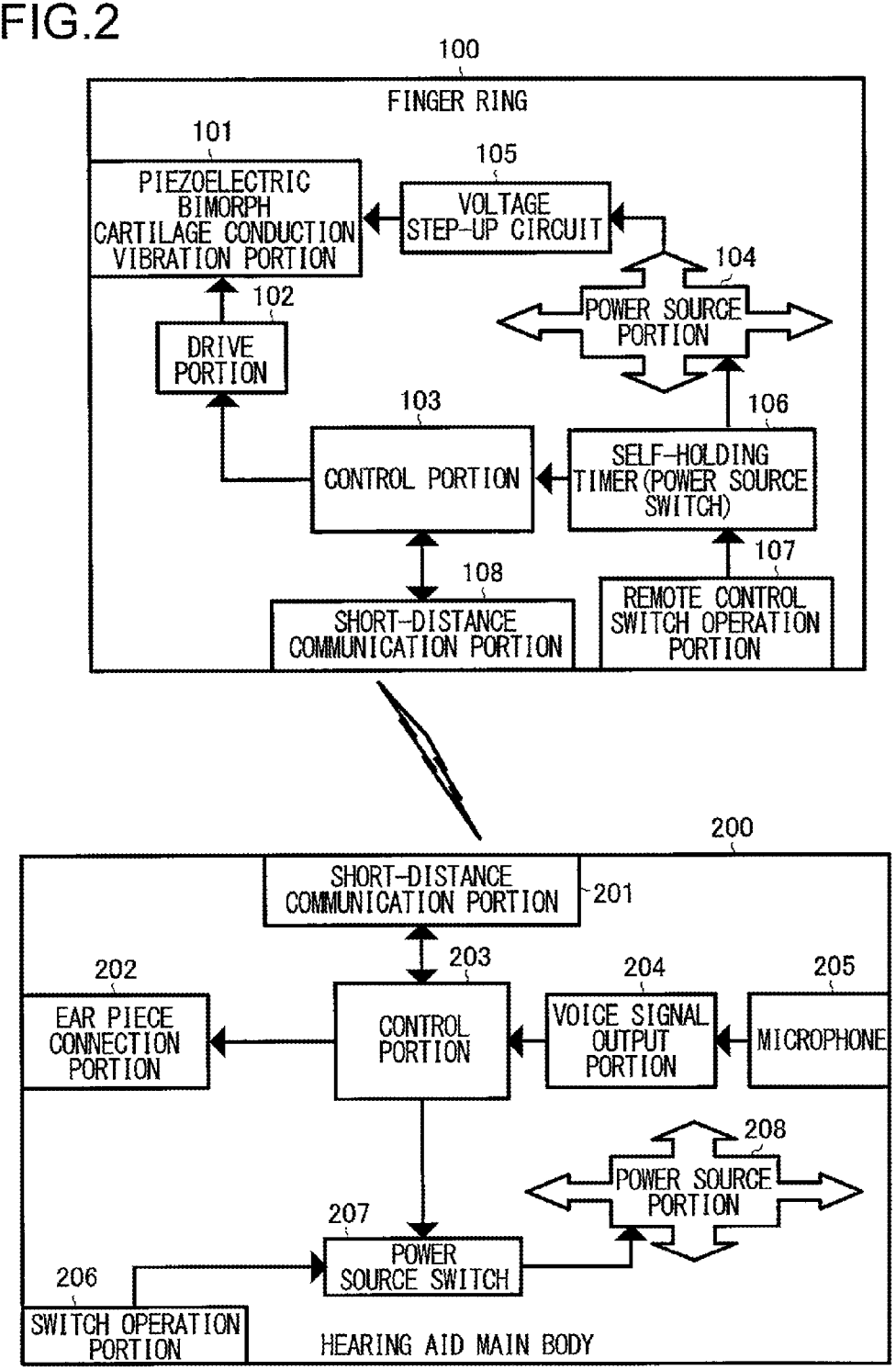
FIG. 2 is a block diagram showing a first embodiment (a hearing aid system that includes a finger ring and a hearing aid main body) of a hearing system.

FIG. 2 is a block diagram which shows a first embodiment (a hearing aid system that includes a finger ring and a hearing aid main body) of the hearing system, and shows a structure equivalent to the schematic view of FIG. 1. The hearing aid system according to the first embodiment has a finger ring 100 and a hearing aid main body 200.

The finger ring 100 is equivalent to the finger ring 1 in FIG. 1 and includes: a piezoelectric bimorph cartilage conduction vibration portion 101; a drive portion 102; a control portion 103; a power source portion 104; a voltage step-up circuit 105; a self-holding timer 106; a remote control switch operation portion 107; and a short-distance communication portion 108.

The piezoelectric bimorph cartilage conduction vibration portion 101 is a vibration output portion that generates and transmits a cartilage conduction vibration to the finger A (see FIG. 1). The piezoelectric bimorph cartilage conduction vibration portion 101 is disposed at a position to contact the finger A with the finger ring 100 mounted on the finger A. The piezoelectric bimorph cartilage conduction vibration portion 101 needs to be supplied with a step-up voltage as a piezoelectric bimorph drive voltage from the voltage step-up circuit 105. Thanks to a combination of the piezoelectric bimorph cartilage conduction vibration portion 101 and the voltage step-up circuit 105, it becomes possible to achieve a compact cartilage conduction vibration portion suitable for the mounting onto the finger ring 100. However, the type of the cartilage conduction vibration portion is not limited to the type that uses the piezoelectric bimorph, and for example, an electromagnetic cartilage conduction vibration portion may be used. In the meantime, in a case where the electromagnetic cartilage conduction vibration portion is used, the voltage step-up circuit is not necessary, accordingly, it becomes possible to simplify the circuit structure.

The drive portion 102 drives the piezoelectric bimorph cartilage conduction vibration portion 101 based on an instruction from the control portion 103.

The control portion 103 is a main body (e.g., CPU [Central Processing Unit]) that comprehensively controls operation of the finger ring 100. For example, the control portion 103 performs drive control of the piezoelectric bimorph cartilage conduction vibration portion 101 via the drive portion 102 such that a voice signal received by the short-distance communication portion 108 is converted into a cartilage conduction vibration and output.

The power source portion 104 generates a predetermined internal voltage from a battery voltage and performs electric power supply to each portion of the finger ring 100.

The voltage step-up circuit 105 steps up the internal voltage generated by the power source portion 104 to produce a drive voltage for the piezoelectric bimorph cartilage conduction vibration portion 101. In the meantime, as the voltage step-up circuit 105, it is possible to use a voltage step-up switching regulator and a voltage step-up charge pump.

The self-holding timer 106 is a power source switch that sends an instruction to the control portion 103 and the power source portion 104 such that the finger ring 100 is kept in an on-state for a predetermined self-holding time span Ton (e.g., 5 minutes) after a power source turning-on operation is received by the remote control switch operation portion 107. In the meantime, count operation of the self-holding time span Ton performed by the self-holding timer 106 is reset and restarted at every time the power source turning-on operation is received by the remote control switch operation portion 107. Accordingly, in a case where another power source turning-on operation is received by the remote control switch operation portion 107 during the count operation of the self-holding time Ton performed by the self-holding timer 106, the power source turning-on period of the finger ring 100 is extended such that the finger ring 100 is kept in the on-state for the self-holding time span Ton from the reception time point. On the other hand, in a case where the power source turning-on operation is not received by the remote control switch operation portion 107 during the self-holding time span Ton, the self-holding timer 106 sends an instruction to the control portion 103 and the power source portion 104 such that the finger ring 100 is switched to an off-state.

According to this structure including the self-holding timer 106, the power source turning-on operation is received by the remote control switch operation portion 107, the finger ring 100 is kept in the on-state for the self-holding time span Ton, thereafter, the finger ring 100 is automatically switched to the off-state. Accordingly, it is possible to perform the hearing aid for a relatively long time without requiring the complicated power source turning-on/off operations. Besides, upon the self-holding time span Ton passing, the power source is automatically turned off, accordingly, it is possible to alleviate wasteful power consumption of the finger ring 100.

Besides, according to the structure including the self-holding timer 106, the count of the self-holding time span Ton restarts after the last operation by only repeating the power source turning-on operations at short natural timings shorter than the self-holding time span Ton, it is possible to extend the power source turning-on period of the finger ring 100.

In the meantime, for example, as described in the example, in the case where a piezoelectric bimorph is used as the cartilage conduction vibration portion 101, there is a case where it takes a predetermined time span for the drive voltage to reach a predetermined target value depending on the voltage step-up circuit and it is impossible to perform the hearing aid using the cartilage conduction immediately after the startup of the finger ring 100. Because of this, if the power source turning-on operation of the finger ring 100 is performed whenever necessary, there is a risk that an important talk immediately after the turning-on of the power source could be missed. In contrast to this, according to the structure including the self-holding timer 106, it is possible to keep the power source portion 104 and the voltage step-up circuit 105 in the on-state after the power source turning-on operation is received by the remote control switch operation portion 107, accordingly, it becomes possible to reduce the risk that the above disadvantage could occur.

The remote control switch operation portion 107 is a user interface that receives the power source turning-on operation of the finger ring 100. For example, in a case where a push button is used as the remote control switch operation portion 107, the use can perform the power source turning-on operation of the finger ring 100 by only pushing the remote control switch operation portion 107 one time.

Based on the instruction from the control portion 103, the short-distance communication portion 108 performs wireless communication with a short-distance communication portion 201 disposed in the hearing aid main body 200. In a specific example, the short-distance communication portion 108 receives a voice signal from the short-distance communication portion 201 and sends the voice signal to the control portion 103. Besides, the short-distance communication portion 108 transmits a remote control switch operation signal from the control portion 103 to the short-distance communication portion 201. The remote control switch operation signal is an information signal that indicates whether the power source turning-on operation is received by the remote control switch operation portion 107 or not, in other words, whether the finger ring 100 is in the on-state or not. In the meantime, as the short-distance communication portion 108, it is possible to suitably use a wireless communication module IC in conformity with wireless communication standards such as Bluetooth (registered trademark) and the like.

The hearing aid main body 200 is equivalent to the hearing device main body 2 in FIG. 1 and includes: the short-distance communication portion 201; an ear piece connection portion 202; a control portion 203; a voice signal output portion 204; a microphone 205; a switch operation portion 206; a power source switch 207; and a power source portion 208.

Based on an instruction from the control portion 203, the short-distance communication portion 201 performs wireless communication with the short-distance communication portion 108 disposed in the finger ring 100. In a specific example, the short-distance communication portion 201 transmits a voice signal from the control portion 203 to the short-distance communication portion 108. Besides, the short-distance communication portion 201 receives a remote control switch operation signal from the short-distance communication portion 108 and sends the signal to the control portion 203. In the meantime, as the short-distance communication portion 201, it is possible to suitably use a wireless communication module IC in conformity with wireless communication standards such as Zigbee (registered trademark), Bluetooth (registered trademark) and the like.

The ear piece connection portion 202 is an interface for connecting the acoustic ear piece 3 (see FIG. 1). According to the structure that includes the ear piece connection portion 202, on the basis of an existing hearing aid system that includes the general ear piece 3 (see FIG. 1) and the hearing aid main body 200, it is possible to compose a hearing aid system that has the finger ring 100 of the cartilage conduction type.

The control portion 203 is a main body (e.g., CPU) that comprehensively controls operation of the hearing aid main body 200. For example, when the hearing aid main body 200 is set at a standby state, the control portion 203 monitors the remote control switch operation signal (on/off-states of the finger ring 100) transmitted via the short-distance communication portion 201 and performs remote control (on/off control) of the power source switch 207 in accordance with the remote control switch operation signal.

As to the hearing aid system, a battery capacity (battery drive time span) is a special issue. Accordingly, the control portion 203 is composed to put the hearing aid main body 200 (more specifically, the power source switch 207) into an on-state associating with the on-state of the finger ring 100. According to this structure, it becomes possible to reduce power consumption of the entire hearing aid system as small as possible when the hearing aid is not necessary and to put the entire hearing aid system into an on-state as soon as the hearing aid becomes necessary.

Besides, in the case where the hearing aid is performed by using the ear piece 3 (see FIG. 1), it is also possible to use the finger ring 100 as a remote controller (remote power source switch) of the hearing aid main body 200. According to this structure, it becomes not only unnecessary to prepare an additional remote controller of the hearing aid main body 200 but also it becomes less risky to lose the remote controller. In the meantime, in a case where the finger ring 100 is equipped with only the remote control function of the hearing aid main body 200, of the constituent components shown in FIG. 2, the piezoelectric bimorph cartilage conduction vibration portion 101, the drive portion 102 and the voltage step-up circuit 105 become unnecessary.

The voice signal output portion 204 applies various signal processes (noise removal process and the like) to a voice signal generated by the microphone 205 and outputs the processed voice signal to the control portion 203.

The microphone 205 converts a voice from around into an electric voice signal.

The switch operation portion 206 is a user interface for receiving a function switchover operation of the hearing aid main body 200. There are three function states prepared (normally on-state, normally off-state, and standby state) for the hearing aid main body 200. In the normally on-state, without depending on the on/off-states of the finger ring 100, the hearing aid main body 200 is always put into the on-state. This function state may be selected in a case where the hearing aid is constantly performed by using the ear piece 3 (see FIG. 1). In the normally off-state, without depending on the on/off-states of the finger ring 100, the hearing aid main body 200 is always put into the off-state. This function state may be selected in a case where the hearing aid is not necessary at all (a case where the user is sleeping and the like). In the standby state, as described above, the on/off-states of the hearing aid main body 200 are remotely controlled associating with the on/off-states of the finger ring 100. This function state may be selected in a case where the hearing aid is performed by using the finger ring 100 in an emergency.

Based on the instruction from the control portion 203 and the switch control portion 206, the power source switch 207 performs on/off control of the power source portion 208.

The power source portion 208 generates a predetermined internal voltage from the battery voltage and performs electric power supply to each portion of the hearing aid main body 200. In the meantime, in a case where the hearing aid main body 200 is kept in the standby state, the power source portion 208 continues electric power supply to a circuit block (the control portion 201 and the short-distance communication portion 203) that is necessary to await and receive the remote control switch operation signal wirelessly transmitted from the finger ring 100, and stops the electric power supply to the other circuit blocks.

Second Embodiment

Figure 3:
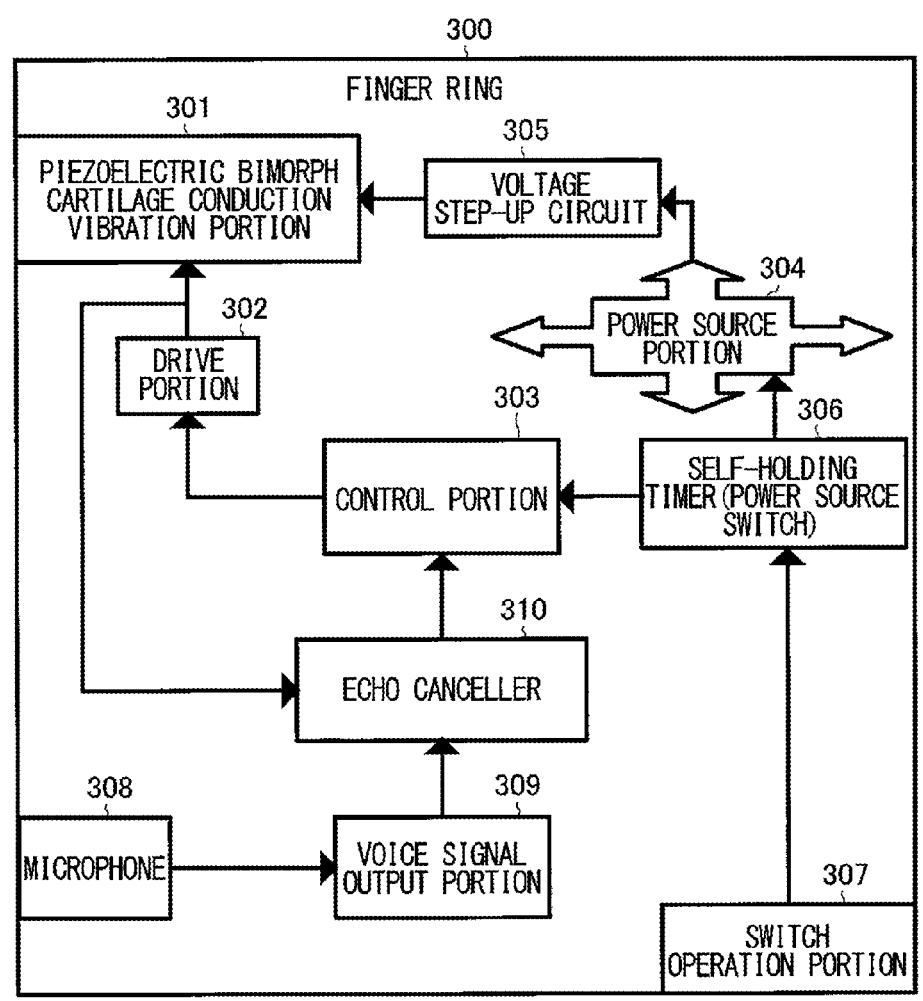
FIG. 3 is a block diagram showing a second embodiment (a hearing aid system that includes a finger ring only) of a hearing system.

FIG. 3 is a block diagram showing a second embodiment (a hearing aid system that includes a finger ring only) of the hearing system. A finger ring 300 forming a hearing aid system according to the second embodiment has a combined structure of the finger ring 100 and hearing aid main body 200 in FIG. 2 and includes: a piezoelectric bimorph cartilage conduction vibration portion 301; a drive portion 302; a control portion 303; a power source portion 304; a voltage step-up circuit 305; a self-holding timer 306; a remote control switch operation portion 307; a microphone 308; a voice signal output portion 309; and an echo canceller 310.

Of the constituent components shown in FIG. 3, the piezoelectric bimorph cartilage conduction vibration portion 301, the drive portion 302, the control portion 303, the power source portion 304, the voltage step-up portion 305, the self-holding timer 306, the remote control switch operation portion 307, the microphone 308, the voice signal output portion 309 are equivalent to the piezoelectric bimorph cartilage conduction vibration portion 101, the drive portion 102, the control portion 103, the power source portion 104, the voltage step-up portion 105, the self-holding timer 106, the remote control switch operation portion 107, the microphone 205, the voice signal output portion 204 in FIG. 2, respectively. Accordingly, hereinafter, description is performed focusing on characterizing constituent components and operation of the second embodiment, and description overlapping the first embodiment is suitably skipped.

The control portion 303 performs drive control of the piezoelectric bimorph cartilage conduction vibration portion 301 via the drive portion 302 such that a voice signal transmitted from the voice signal output portion 309 via the echo canceller 310 is converted into a cartilage conduction vibration and output.

The echo canceller 310 generates, by means of an adapted filter, a quasi-echo signal from a drive signal that is supplied from the drive portion 302 to the piezoelectric bimorph cartilage conduction vibration portion 301, and adds the quasi-echo signal to the voice signal from the voice signal output portion 309. According to the structure in which the echo canceller 310 is disposed, it becomes possible to suitably cancel an echo component (vibration component of the piezoelectric bimorph cartilage conduction vibration portion 301 detected by the microphone 308) contained in the voice signal from the voice signal output portion 309.

As described above, according to the hearing aid system that uses the finger ring 300 incorporating the microphone, the hearing aid main body becomes unnecessary, accordingly, it becomes possible to raise mobility of the hearing aid system.

Third Embodiment

Figure 4:
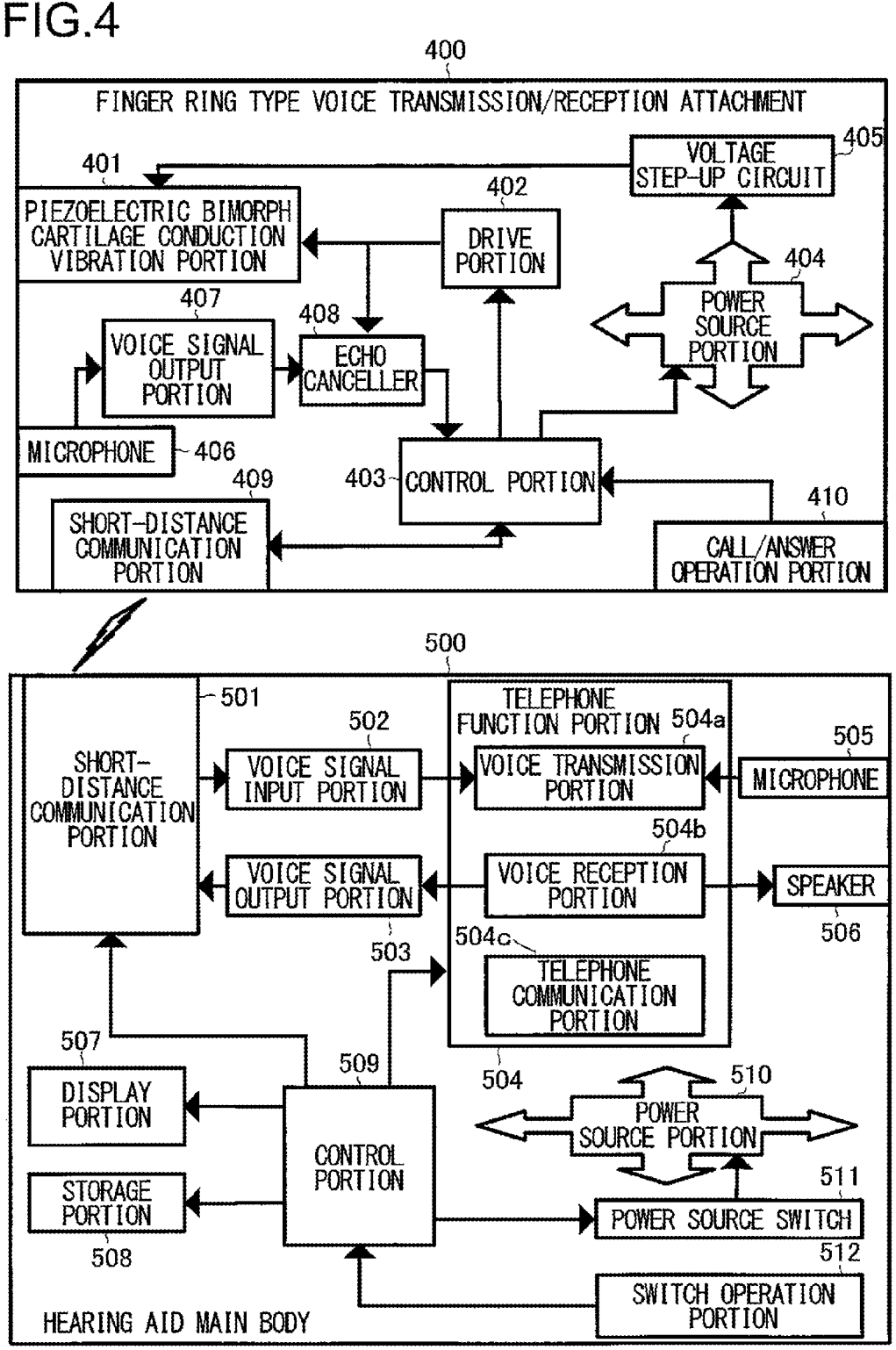
FIG. 4 is a block diagram showing a third embodiment (a hearing aid system that includes a finger ring and a mobile phone main body) of a hearing system.

FIG. 4 is a block diagram showing a third embodiment (a mobile phone system that includes a finger ring and a mobile phone main body) of the hearing system. The mobile phone system according to the third embodiment has a finger ring type voice transmission/reception attachment 400 and a mobile phone main body 500.

The finger ring type call/answer attachment 400 is equivalent to the finger ring 1 in FIG. 1 and includes: a piezoelectric bimorph cartilage conduction vibration portion 401; a drive portion 402; a control portion 403; a power source portion 404; a voltage step-up circuit 405; a microphone 406; a voice signal output portion 407; an echo canceller 408; a short-distance communication portion 409; and a call/answer operation portion 410.

The piezoelectric bimorph cartilage conduction vibration portion 401 is a vibration output portion that generates and transmits a cartilage conduction vibration to the finger A (see FIG. 1). The piezoelectric bimorph cartilage conduction vibration portion 401 is disposed at a position to contact the finger A with the finger ring type voice transmission/reception attachment 400 mounted on the finger A. The piezoelectric bimorph cartilage conduction vibration portion 401 needs to be supplied with a step-up voltage as a piezoelectric bimorph drive voltage from the voltage step-up circuit 405. Thanks to a combination of the piezoelectric bimorph cartilage conduction vibration portion 401 and the voltage step-up circuit 405, it becomes possible to achieve a compact cartilage conduction vibration portion suitable for the mounting onto the finger ring type voice transmission/ reception attachment 400. However, the type of the cartilage conduction vibration portion is not limited to the type that uses the piezoelectric bimorph, and for example, an electromagnetic cartilage conduction vibration portion may be used. In the meantime, in a case where the electromagnetic cartilage conduction vibration portion is used, the voltage step-up circuit is not necessary, accordingly, it becomes possible to simplify the circuit structure.

The drive portion 402 drives the piezoelectric bimorph cartilage conduction vibration portion 401 based on an instruction from the control portion 403.

The control portion 403 is a main body (e.g., CPU) that comprehensively controls operation of the finger ring type voice transmission/reception attachment 400. For example, the control portion 403 performs drive control of the piezoelectric bimorph cartilage conduction vibration portion 401 via the drive portion 402 such that an incoming voice signal received by the short-distance communication portion 409 is converted into a cartilage conduction vibration and output. Besides, the control portion 403 performs communication control of the short-distance communication portion 409 such that an outgoing voice signal generated by the microphone 406 is wirelessly transmitted to the mobile phone main body 500.

Besides, the control portion 403 performs drive control of the piezoelectric bimorph cartilage conduction vibration portion 401 via the drive portion 402 such that an incoming alert vibration is generated in accordance with an incoming signal from the mobile phone main body 500. According to this structure, it becomes possible to notify the user of an incoming to the mobile phone main body 500. In the meantime, if the piezoelectric bimorph cartilage conduction vibration portion 401 doubles as an incoming alert vibration portion, size enlargement of the finger ring type voice transmission/reception attachment 400 is not incurred. Of course, separately from the piezoelectric bimorph cartilage conduction vibration portion 401, an incoming alert vibration portion dedicated to the incoming alert may be disposed.

Besides, when the incoming alert signal from the mobile phone main body 500 is received by the short-distance communication portion 409, or when the user's call operation is received by the call/answer operation portion 410, the control portion 403 performs on/off control of the power source portion 404 such that electric power supply to the finger ring type voice transmission/reception attachment 400 is started. According to this structure, it becomes possible to reduce power consumption of the finger ring type voice transmission/reception attachment 400 and to extend the battery drive time span.

The power source portion 404 generates a predetermined internal voltage from the battery voltage and performs electric power supply to each portion of the finger ring type voice transmission/reception attachment 400. In the meantime, in a case where the finger ring type voice transmission/reception attachment 400 is kept in a standby state, the power source portion 404 continues awaiting and receiving the incoming alert signal wirelessly transmitted from the mobile phone main body 500 and electric power supply to a circuit block (the control portion 403, the the short-distance communication portion 409 and the call/answer operation portion 410) that is necessary to await and receive the call operation by the user, and stops the electric power supply to the other circuit blocks.

The voltage step-up circuit 405 steps up an internal voltage generated by the power source portion 404 to produce a drive voltage for the piezoelectric bimorph cartilage conduction vibration portion 401. In the meantime, as the voltage step-up circuit 405, it is possible to use a voltage step-up switching regulator and a voltage step-up charge pump.

The microphone 406 converts a voice (voice released from the user) from around into an electric voice signal.

The voice signal output portion 407 applies various signal processes (noise removal process and the like) to the voice signal generated by the microphone 406 and outputs the processed voice signal to the echo canceller 408.

The echo canceller 408 generates a quasi-echo signal from a drive signal that is supplied from the drive portion 402 to the piezoelectric bimorph cartilage conduction vibration portion 401, adds the quasi-echo signal to the voice signal from the voice signal output portion 407 and outputs the signal to the control portion 403. According to the structure in which the echo canceller 408 is disposed, it becomes possible to suitably cancel an echo component (vibration component of the piezoelectric bimorph cartilage conduction vibration portion 401 detected by the microphone 406) contained in the voice signal from the voice signal output portion 407.

Based on an instruction from the control portion 403, the short-distance communication portion 409 performs wireless communication with the short-distance communication portion 501 disposed in the mobile phone man body 400. In a specific example, the short-distance communication portion 409 receives an incoming voice signal from the short-distance communication portion 501 and transmits the signal to the control portion 403. Besides, the short-distance communication portion 409 transmits a signal (hereinafter, called a call/answer operation signal) corresponding to a call/answer operation received by the call/answer operation portion 410 and transmits the signal to the short-distance communication portion 501. In the meantime, as the short-distance communication portion 409, it is possible to suitably use a wireless communication module IC in conformity with wireless communication standards such as Bluetooth (registered trademark) and the like.

The call/answer operation portion 410 is a user interface (manual operation switch) that receives a call/answer operation by the user.

The mobile phone main body 500 is equivalent to the hearing device main body 2 in FIG. 1 and includes: the short-distance communication portion 501; a voice signal input portion 502; a voice signal output portion 503; a telephone function portion 504; a microphone 505; a speaker 506; a display portion 507; a storage portion 508; a control portion 509; a power source portion 510; a power source switch 511; and a switch operation portion 512.

Based on an instruction from the control portion 509, the short-distance communication portion 501 performs wireless communication with the short-distance communication portion 409 disposed in the finger ring type voice transmission/reception attachment 400. In a specific example, the short-distance communication portion 501 transmits an incoming voice signal from the voice signal output portion 503 to the short-distance communication portion 409. Besides, the short-distance communication portion 501 receives an outgoing voice signal from the short-distance communication portion 409 and sends the signal to the voice signal input portion 502. Besides, the short-distance communication portion 501 receives the call/answer operation signal from the short-distance communication portion 409 and transmits the signal to the control portion 509. In the meantime, as the short-distance communication portion 501, it is possible to suitably use a wireless communication module IC in conformity with wireless communication standards such as Bluetooth (registered trademark) and the like. Accordingly, the short-distance communication portion 501 can perform the short-distance wireless communication with not only the finger ring type voice transmission/reception attachment 400 but also voice transmission/reception attachments such as a vehicle audio device, a head set and the like.

The voice signal input portion 502 sends the outgoing voice signal received by the short-distance communication portion 501 to the telephone function portion 504 (especially, a voice transmission portion 504a).

The voice signal output portion 503 sends the incoming voice signal received by the telephone function portion 504 (especially, voice reception portion 504b) to the short-distance communication portion 501.

The telephone function portion 504 is able to perform a voice talk via a wireless telephone line by using the voice transmission portion 504a and the voice reception portion 504b. Besides, the telephone function portion 504 is also able to perform data communication via the wireless telephone line by using the telephone communication portion 504c.

Besides, the telephone function portion 504 includes a function to switch input/output ports of the voice transmission portion 504a and voice reception portion 504b in accordance with whether the short-distance wireless communication is performed or not between the mobile phone main body 500 and an external device (in FIG. 4, the finger ring type voice transmission/reception attachment 400) via the short-distance communication portion 501. For example, in a case where the short-distance wireless communication is performed between the mobile phone main body 500 and the finger ring type voice transmission/reception attachment 400, the outgoing voice signal is transmitted from the voice signal input portion 502 to the voice transmission portion 504a, while the incoming voice signal is transmitted from the voice reception portion 504b to the voice signal output portion 503. On the other hand, in a case where the short-distance wireless communication is not performed between the mobile phone main body 500 and the finger ring type voice transmission/reception attachment 400, the outgoing voice signal is transmitted from the microphone 505 to the voice transmission portion 504a, while the incoming voice signal is transmitted from the voice reception portion 504b to the speaker 506. In other words, in the former case, a voice talk using the finger ring type voice transmission/reception attachment 400 is performed, while in the latter case, a voice talk using the mobile phone main body 500 only is performed.

The microphone 505 converts a voice (voice released from the user) from around into an electric voice signal and transmits the electric voice signal to the voice transmission portion 504a. In the meantime, the microphone 505 acquires a outgoing voice during the voice talk time that uses the mobile phone main body 500 only.

The speaker 506 outputs a incoming alert voice and various guide voices in accordance with control from the control portion 509. Besides, also the speaker 506 outputs a incoming voice during the voice talk time that uses the mobile phone main body 500 only. In the meantime, as the speaker 506, it is also possible to use the ear piece 3 in FIG. 1.

The display portion 507 displays a letter and an image in accordance with the control from the control portion 509. In the meantime, as the display portion 507, it is possible to preferably use a liquid crystal display and an organic EL [Electro Luminescence] display.

The storage portion 508 stores various programs that are read by the control portion 509 and executed. Besides, the storage portion 508 is also used as a temporary storage area for data necessary to the operation of the control portion 509 and as a deploy area for various programs.

The control portion 509 is a main body (e.g., CPU) that comprehensively controls the operation of the mobile phone main body 500.

The power source portion 510 generates a predetermined internal voltage from the battery voltage and performs electric power supply to each portion of the mobile phone main body 500.

Based on instructions from the control portion 509 and the switch operation portion 512, the power source switch 510 performs on/off control of the power source portion 510.

The switch operation portion 512 is a user interface that receives a user operation. In the meantime, as the switch operation portion 512, it is possible to preferably use various keys and buttons, a touch panel and the like.

As described above, the mobile phone system is built by using the finger ring type voice transmission/reception attachment 400 that includes a cartilage conduction vibrator and a small-sized microphone, whereby it becomes possible for the user to perform the incoming confirmation and the voice talk without using the mobile phone main body 500. In the meantime, the cartilage conduction vibrator can double as a manner mode vibrator. In this case, the vibration is not captured by an ear but by a finger, accordingly, it is not necessary to set the vibration frequency into an audible band and is also possible to set a low frequency that is easily captured by the finger. In the meantime, the manner mode vibrator is not limited to the case to double as the cartilage conduction vibrator, and another vibrator may be employed.

In the meantime, in FIG. 4, the structure, in which only one finger ring type voice transmission/reception attachment 400 is connected to the mobile phone main body 500, is described as an example; however, the structure of the present invention is not limited to this, and a structure may be employed, in which the cartilage conduction vibrator, the small-sized microphone and another manner mode vibrator function portion are housed separately from one another in a plurality of the finger ring type voice transmission/reception attachments and connected to one another over the short-distance communication. According to this structure, for example, by housing the cartilage conduction vibrator into a first finger ring type voice transmission/reception attachment mounted on a finger of one hand that easily touches a dominant ear and by housing the small-sized microphone into a second finger ring type voice transmission/reception attachment mounted on a finger of the other hand, it becomes possible to achieve reduction in howling. Besides, a small amount of information is ample for control of the manner mode vibrator, it is also possible to employ short-distance communication means such as Zigbee (registered trademark) and the like. In the meantime, as the block 500 in the third embodiment, not only a usual-sized mobile phone but also a large-screen mobile communication terminal having the telephone function may be employed. In this case, the "mobile phone main body 500" in FIG. 4 is replaced with a "large-screen mobile communication terminal 500" and the like.

Fourth Embodiment

Figure 5:
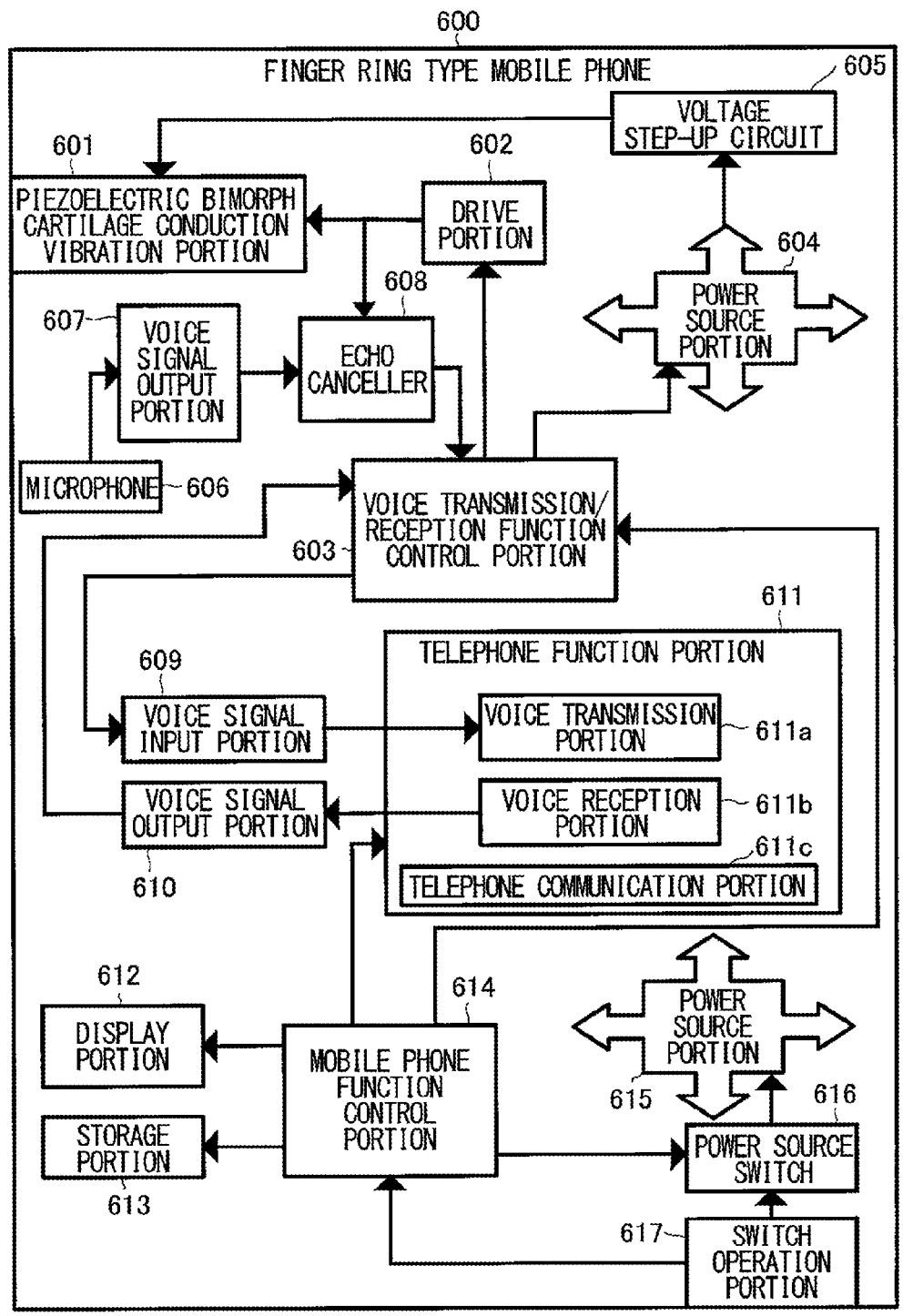
FIG. 5 is a block diagram showing a fourth embodiment (a finger ring type mobile phone) of a hearing system.

FIG. 5 is a block diagram showing a fourth embodiment (finger ring type mobile phone) of the hearing system. A finger ring type mobile phone 600 forming the hearing system according to the fourth embodiment has a combined structure of the finger ring type voice transmission/reception attachment 400 and the mobile phone main body 500 in FIG. 4 and includes: a piezoelectric bimorph cartilage conduction vibration portion 601; a drive portion 602; a voice transmission/reception function control portion 603; a power source portion 604; a voltage step-up circuit 605; a microphone 606; a voice signal output portion 607; an echo canceller 608; a voice signal output portion 609; a voice signal output portion 610; a telephone function portion 611; a display portion 612; a storage portion 613; a mobile phone function control portion 614; a power source portion 615; a power source switch 616; and a switch operation portion 617.

Of the constituent components shown in FIG. 5, the piezoelectric bimorph cartilage conduction vibration portion 601, the drive portion 602, the voice transmission/reception function control portion 603, the power source portion 604, the voltage step-up portion 605, the microphone 606, the voice signal output portion 607, the echo canceller 608, the voice signal input portion 609, the voice signal output portion 610, the telephone function portion 611, the display portion 612, the storage portion 613, the mobile phone function control portion 614, the power source portion 615, the power source switch 616, and the switch operation portion 617 are equivalent to the piezoelectric bimorph cartilage conduction vibration portion 401, the drive portion 402, the control portion 403, the power source portion 404, the voltage step-up portion 405, the microphone 406, the voice signal output portion 407, the echo canceller 408, the voice signal input portion 502, the voice signal output portion 503, the telephone function portion 503, the display portion 507, the storage portion 508, the control portion 509, the power source portion 510, the power source switch 511, and the switch operation portion 512 in FIG. 4, respectively.

In other words, it is sayable that the finger ring type mobile phone 600 has a structure in which finger ring type voice transmission/reception attachment 400 and the mobile phone main body 500 in FIG. 4 are combined with each other and the unnecessary short-distance communication portions 409 and 501 are removed. According to the finger ring type mobile phone 600, the mobile phone main body becomes unnecessary, accordingly, it becomes possible to raise mobility of the mobile phone system.

<Finger Ring>

Figure 6:
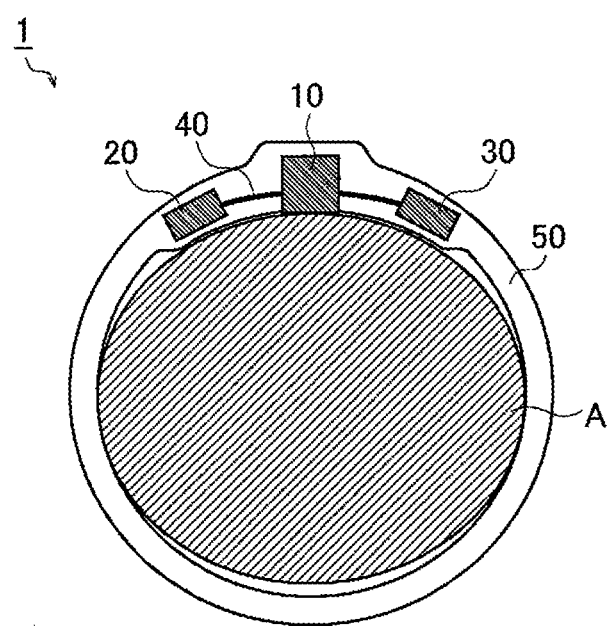
FIG. 6 is a sectional view schematically showing a structural example of a finger ring 1.

FIG. 6 is a sectional view schematically showing a structural example of the finger ring 1. The finger ring 1 in the present structural example has a structure that gives the cartilage conduction vibration to a third joint of the finger A, more specifically, a finger ring structure that s mounted on the third joint of the finger A to give the cartilage conduction vibration. In the meantime, taking a close look at constituent components, the finger ring 1 in the present structural example has: a main unit 10; a power source unit 20; a communication unit 30; a cable 40; and a finger ring type housing 50.

The main unit 10 is a unit that gives the cartilage conduction vibration mainly to the finger A and is housed in the finger ring type housing 50 to oppose the back of the finger A when the finger ring type housing 50 is mounted on the finger A. In the meantime, an internal structure and operation of the main unit 10 are described in detail later.

The power source unit 20 is a unit that performs electric power supply mainly to the main unit 10 and the communication unit 30 and is housed in the finger ring type housing 50 to oppose the back of the finger A when the finger ring type housing 50 is mounted on the finger A. In the meantime, an internal structure and operation of the power source unit 20 are described in detail later.

The communication unit 30 is a unit that performs wireless communication mainly with the hearing device main body 2 and is housed in the finger ring type housing 50 to oppose the back of the finger A when the finger ring type housing 50 is mounted on the finger A. In the meantime, an internal structure and operation of the communication unit 30 are described in detail later.

The cable 40 is housed in the finger ring type housing 50 to electrically connect the main unit 10, the power source unit 20 and the communication unit 30 to one another.

The finger ring type housing 50 houses the main unit 10; the power source unit 20; the communication unit 30; and the cable 40, and is mounted on the third joint of the finger A.

As described above, according to the finger ring 1 mounted on the third joint of the finger A, as long as the user does not intentionally try to demount the finger ring 1 from the finger A, there is almost no risk that the finger ring 1 could come off the finger A in daily life, accordingly, it becomes possible to build a hearing system that does not restrict the user's action.

In the meantime, if the finger ring type housing 50 is formed of a flexible material (silicone rubber and the like), it becomes possible to give a great degree of freedom to the mountable size of the finger ring 1.

Besides, it is desirable that the finger ring type housing 50 is formed to have a waterproof structure. According to this structure, even if being wet with water (rain) and sweat, the finger ring type housing becomes unlikely to malfunction. Besides, in a case where the finger ring 1 is shared with many people, by washing the whole finger ring type housing 50, it becomes possible to keep the finger ring 1 clean.

Besides, in the above structural example, the structure, in which the main unit 10, the power source unit 20, and the communication unit 30 are units independent of one another, is described as an example; however, the structure of the present invention is not limited to this, and the plurality of units may be grouped into one. Besides, also the housing positions of the main unit 10, the power source unit 20, and the communication unit 30 in the finger ring type housing 50 are not limited to the above structural example.

<Main Unit>

Figure 7:
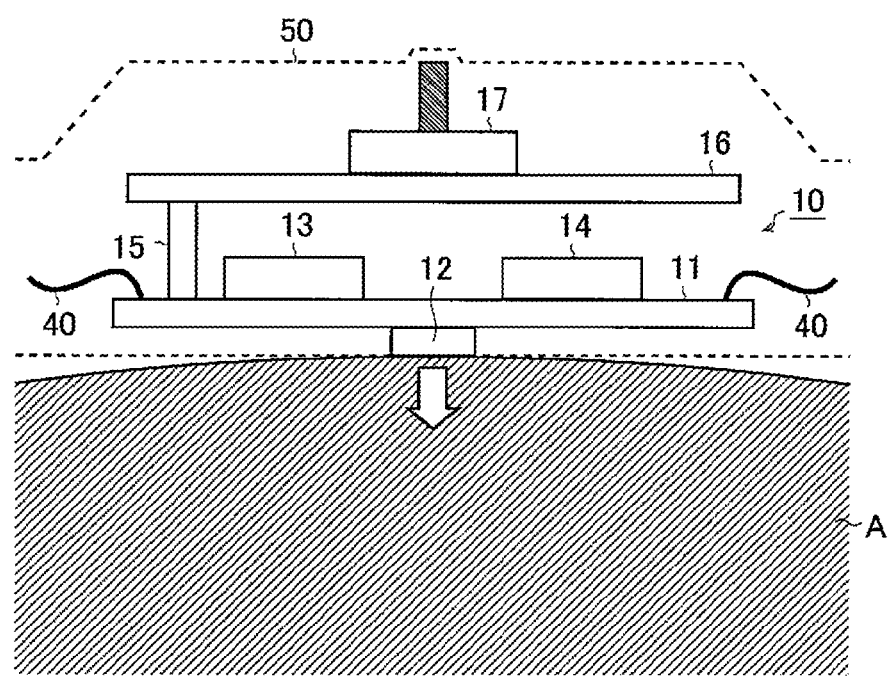
FIG. 7 is a sectional view schematically showing a structural example of a main unit 100.

FIG. 7 is a sectional view schematically showing a structural example of the main unit 10. The main unit 10 in the present structural example includes: a first board 11; a piezoelectric bimorph cartilage conduction vibration portion 12; a control portion 13; a drive portion 14; a connector 15; a second board 16; and an operation portion 17.

The piezoelectric bimorph cartilage conduction vibration portion 12 is mounted on a front surface of the first board 11, while the control portion 13 and the drive portion 14 are directly mounted on a rear surface of the first board 11. Besides, the first board 11 is also connected to the cable 40 for performing electrical connection between the power source unit 20 and the communication unit 30. In the meantime, electrical connection is performed between the front surface and the rear surface of the first board 11 via a through-hole and a via. As described above, by effectively using both surfaces of the first board 11, it is possible to reduce the area of the first board 11, accordingly, it becomes possible to limit the main unit 10 to a size that does not become larger than the third joint of the finger A, which does not give a feeling of the mounting of the finger ring 1 to the user.

The piezoelectric bimorph cartilage conduction vibration portion 12 is a vibration output portion that generates and transmits the cartilage conduction vibration to the finger A (see FIG. 1), and is equivalent to the above piezoelectric bimorph cartilage conduction vibration portion 101 (FIG. 2), the piezoelectric bimorph cartilage conduction vibration portion 301 (FIG. 3), the piezoelectric bimorph cartilage conduction vibration portion 401 (FIG. 4), or the piezoelectric bimorph cartilage conduction vibration portion 601 (FIG. 5). As shown in FIG. 7, the piezoelectric bimorph cartilage conduction vibration portion 12 is disposed at a position to contact the finger A with the finger ring 1 mounted on the finger A.

The control portion 13 is a main body (e.g., CPU) that comprehensively controls the operation of the finger ring 1, and is equivalent to the above control portion 103 (FIG. 2), the control portion 303 (FIG. 3), the control portion 403 (FIG. 4), or the voice transmission/reception function control portion 603 and mobile phone function control portion 614 (FIG. 5).

The drive portion 14 is a driver that drives the piezoelectric bimorph cartilage conduction vibration portion 12 in accordance with an instruction from the control portion 13, and is equivalent to the above drive portion 102 (FIG. 2), the drive portion 302 (FIG. 3), the drive portion 402 (FIG. 4), or the drive portion 602 (FIG. 5).

The connector 15 is an electroconductive portion that vertically stacks up the first board 11 and the second board 16.

The operation portion 17 is directly mounted on a front surface of the second board 16, while the connector 15 is connected to a rear surface of the second board 16. In the meantime, electrical connection is performed between the front surface and the rear surface of the second board 16 via a through-hole and a via.

As described above, by employing the stacked-up structure of the plurality of boards, compared with a structure in which all circuit elements are mounted on one board, it is possible to reduce the respective areas of the first board 11 and the second board 16. Accordingly, it becomes possible to limit the main unit 10 to a size that does not become larger than the third joint of the finger A, which does not give a feeling of the mounting of the finger ring 1 to the user.

The operation portion 17 is a user interface that receives the user's operation, and is equivalent to the above remote control switch operation portion 107 (FIG. 2), the switch operation portion 307 (FIG. 3), the call/answer operation portion 410 (FIG. 4), or the switch operation portion 617 (FIG. 5). In the meantime, a structure may be employed, in which to avoid a careless erroneous operation in a case where the hand's back collides with a door and the like and in other such cases, the operation portion 17 is not mounted on an upper surface of the finger ring as shown in FIG. 7 but on a side surface of the finger ring.

<Power Source Unit>

Figure 8:
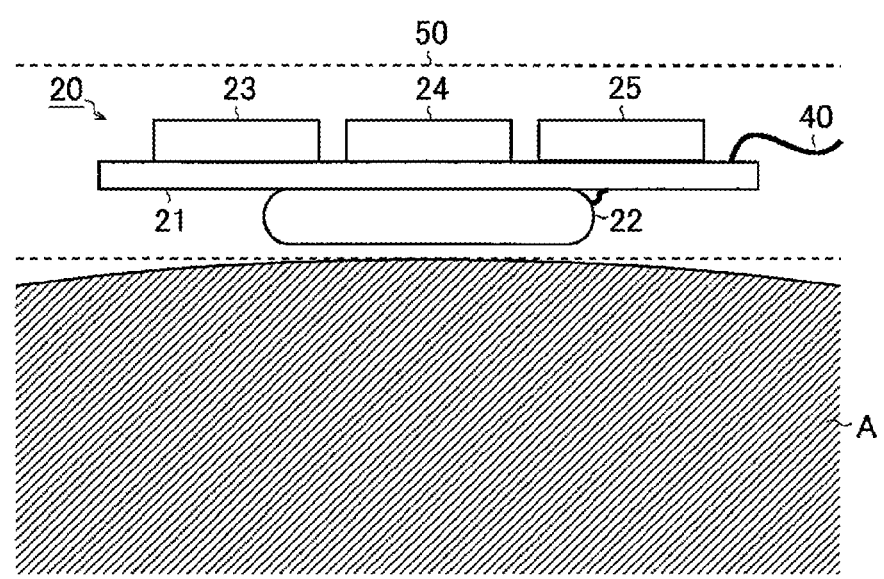
FIG. 8 is a sectional view schematically showing a structural example of a power source unit 200.

FIG. 8 is a sectional view schematically showing a structural example of the power source unit 20. The power source unit 20 in the present structural example includes: a board 21; a battery 22; a power source portion 23; a voltage step-up circuit 24; and a recharge circuit 25.

The battery 22 is mounted on a front surface of the board 21, while the power source portion 23, the voltage step-up circuit 24 and the recharge circuit 25 are directly mounted on a rear surface of the board 21. Besides, the board 21 is also connected to the cable 40 for performing electrical connection with the main unit 10. In the meantime, electrical connection is performed between the front surface and the rear surface of the board 21 via a through-hole and a via. As described above, by effectively using both surfaces of the board 21, it is possible to reduce the area of the board 21, accordingly, it becomes possible to achieve size reduction of the power source unit 20, which does not give a feeling of the mounting of the finger ring 1 to the user.

The battery 22 is an electric power supply source necessary for the driving of the finger ring 1, and it is possible to preferably use a lithium ion secondary battery, an electric double-layer capacitor and the like. As described above, according to the finger ring 1 of the battery drive type, it is not necessary to connect an external electric power supply cable, accordingly, it is possible to avoid restricting the user's action when building the hearing system that use the finger ring 1. In the meantime, in the present structural example, the battery 22 with high flatness is disposed right over the finger A, accordingly, it becomes possible to raise fitness when the finger ring 1 is mounted on the third joint of the finger A, which does not give a feeling of the mounting of the finger ring 1 to the user.

The power source portion 23 is a DC/DC converter that generates a predetermined internal voltage from the battery voltage supplied from the battery 22 and performs electric power supply to each portion of the finger ring 1, and is equivalent to the above power source portion 104 (FIG. 2), the s power source portion 304 (FIG. 3), the power source portion 404 (FIG. 4), or the power source portion 604 and the power source portion 615 (FIG. 5).

The voltage step-up circuit 24 is a circuit block that steps up the internal voltage generated by the power source portion 23 to produce the drive voltage for the piezoelectric bimorph cartilage conduction vibration portion 12, and is equivalent to the above voltage step-up circuit 105 (FIG. 2), the voltage step-up circuit 305 (FIG. 3), the voltage step-up circuit 405 (FIG. 4), or the voltage step-up circuit 605 (FIG. 5).

The recharge circuit 25 receives electric power supply from outside to perform recharge control of the battery 22. In the meantime, as the method for electric power supply from outside, a contact method using a USB [Universal Serial Bus] cable and the like may be used, or non-contact methods such as an electromagnetic method, an electric-field coupling method and a magnetic resonance method may be used. According to the structure that has the recharge means for the battery 22, battery replacement working becomes unnecessary, accordingly, it is possible to raise convenience of the finger ring 1. In the meantime, when forming the finger ring type housing 50 to have a waterproof structure, from the viewpoint of completely excluding an external terminal, it is desirable to employ the non-contact methods as the electric power supply method for the recharge circuit 25.

<Communication Unit>

Figure 9:
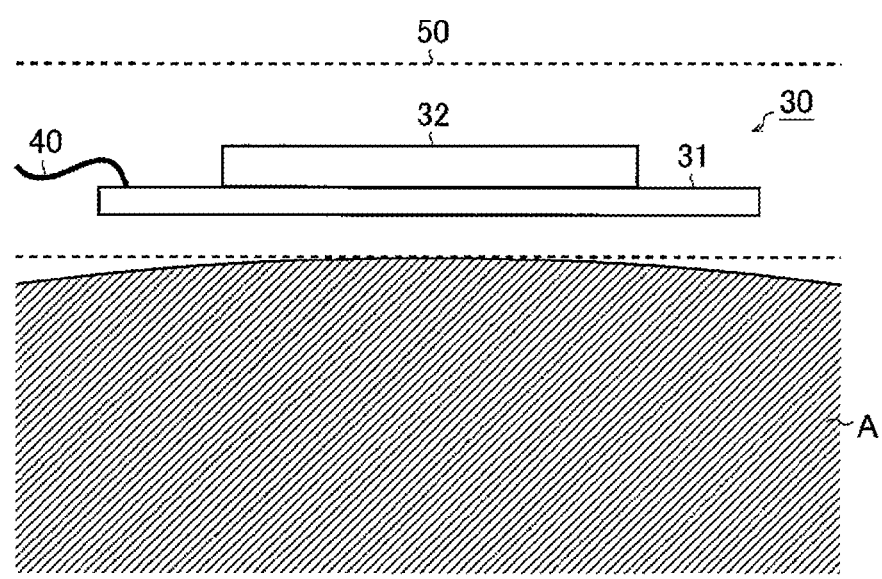
FIG. 9 is a sectional view schematically showing a structural example of a communication unit 300.

FIG. 9 is a sectional view schematically showing a structural example of the communication unit 30. The communication unit 30 in the present structural example includes: a board 31; and a wireless communication circuit 32.

The wireless communication circuit 32 is directly mounted on a front surface of the board 31. Besides, the board 31 is also connected to the cable 40 for performing electrical connection with the main unit 10.

The wireless communication circuit 32 is a circuit block that performs the short-distance wireless communication with the hearing device main body and the voice talk via the wireless telephone line, and is equivalent to the above short-distance communication portion 108 (FIG. 2), the short-distance communication portion 409 (FIG. 4), or the telephone function portion 611 (FIG. 5).

<Summing Up of the Disclosure>

The hearing system disclosed in the present specification is a hearing system that comprises a finger ring and a hearing device main body and has a structure (21st structure), in which the finger ring includes: a first short-distance wireless communication portion; a vibration output portion disposed at a position that contacts a finger to convert a voice signal, which is received by the first short-distance wireless communication portion, into a cartilage conduction vibration and outputs the cartilage conduction vibration; and a first power source portion that performs electric power supply to the first short-distance wireless communication portion and the vibration output portion; the hearing device main body includes: a second short-distance wireless communication portion that performs wireless communication with the first short-distance wireless communication portion; a microphone; a voice signal output portion that makes the second short-distance wireless communication portion output the voice signal according to a voice captured by the microphone; and a second power source portion that performs electric power supply to the second short-distance wireless communication portion, the microphone, and the voice signal output portion.

In the meantime, in the hearing system having the 21st structure, a structure (22nd structure) may be employed, in which the finger ring further includes a power-source switch that turns on/off a power source of the first power source portion; and the second power source portion is remotely controlled in accordance with an on/off-state of the power-source switch that is transmitted from the first short-distance wireless communication portion via the second short-distance wireless communication portion.

Besides, in the hearing system having the 22nd structure, a structure (23rd structure) may be employed, in which the power-source switch includes a self-holding function that holds the on-state for a predetermined self-time span; and count operation during the self-holding time span is reset at each turning-on operation of the power source portion and restarted.

Besides, in the hearing system having any one of the 21st to 23rd structures, a structure (24th structure) may be employed, in which the vibration output portion includes a piezoelectric bimorph; and the power source portion includes a voltage step-up circuit that drives the piezoelectric bimorph.

Besides, in the hearing system having any one of the 21st to 23rd structures, a structure (25th structure) may be employed, in which the vibration output portion includes an electromagnetic vibration portion.

Besides, in the hearing system having any one of the 21st to 25th structures, a structure (26th structure) may be employed, in which the hearing device main body is further connectable to an acoustic ear piece.

Besides, the hearing system having one of the 22st to 26th structures may be structured (27th structure) to be a hearing aid system.

Besides, in the hearing system having any one of the 21st, the 24th and 25th structures, the finger ring may be structured (28th structure) to further include a microphone.

Besides, a structure (29th structure) may be employed, in which the hearing system having the 28th structure is a mobile phone system.

Besides, the hearing system disclosed in the present specification is a hearing system that comprises a finger ring and a hearing device main body and has a structure (30th structure), in which the finger ring includes: a power-source switch that turns on/off a power source; a first short-distance wireless communication portion that transmits an on/off-state of the power-source switch; and a first power source portion that performs electric power supply to the first short-distance wireless communication portion; the hearing device main body includes: a second short-distance wireless communication portion that performs wireless communication with the first short-distance wireless communication portion; a microphone; a voice signal output portion that outputs a voice captured by the microphone as a hearing device voice; and a second power source portion that is remotely controlled in accordance with the on/off-state of the power-source switch, which is transmitted from the first short-distance wireless communication portion via the second short-distance wireless communication portion, and performs electric power supply to the microphone and the voice signal output portion.

Besides, the finger ring for a hearing system disclosed in the present specification is a finger ring for the hearing system, and has a structure (31st structure), which includes: a short-distance wireless communication portion; a vibration output portion disposed at a position that contacts a finger to convert a voice signal, which is received by the short-distance wireless communication portion, into a cartilage conduction vibration and outputs the cartilage conduction vibration; and a power source portion that performs electric power supply to the short-distance wireless communication portion and the vibration output portion.

In the meantime, the finger ring for a hearing system having the 31st structure may have a structure (32nd structure), which further includes a power-source switch that turns on/off a power source of the power source portion, wherein the short-distance wireless communication portion outputs an on/off-state of the power source portion to outside.

Besides, in the finger ring for a hearing system having the 32nd structure, a structure (33rd structure) may be employed, in which the power-source switch includes a self-holding function that holds the on-state for a predetermined self-time span; and count operation during the self-holding time span is reset at each turning-on operation of the power source portion and restarted.

Besides, in the finger ring for a hearing system having any one of the 31st to the 33rd structures, a structure (34th structure) may be employed, in which the vibration output portion includes a piezoelectric bimorph; and the power source portion includes a voltage step-up circuit that drives the piezoelectric bimorph.

Besides, in the finger ring for a hearing system having any one of the 31st to the 33rd structures, a structure (35th structure) may be employed, in which the vibration output portion includes an electromagnetic vibration portion.

Besides, in the finger ring for a hearing system having any one of the 31st to the 35th structures, a structure (36th structure) may be employed, in which the hearing system is a hearing aid system.

Besides, the finger ring for a hearing system having one of the 31st, the 34th and the 35th structures may have a structure (37th structure), which further includes a microphone.

Besides, in the finger ring for a hearing system having the 37th structure, a structure (38th structure) may be employed, in which the hearing system is a mobile phone system.

Besides, the finger ring for a mobile phone disclosed in the present specification is a finger ring that is used together with the mobile phone and has a structure (39th structure), which includes: a short-distance wireless communication portion; a vibration output portion disposed at a position that contacts a finger to convert a voice signal from the mobile phone, which is received by the short-distance wireless communication portion, into a cartilage conduction vibration and outputs the cartilage conduction vibration; a microphone that converts a voice into an electric signal and transmits the signal from the short-distance wireless communication portion to the mobile phone; and a power source portion that performs electric power supply to the short-distance wireless communication portion, the vibration output portion and the microphone.

In the meantime, the finger ring for a mobile phone having the 39th structure may have a structure (40th structure), which further includes a control portion that receives an incoming alert signal via the short-distance wireless communication portion to make the power source portion start the electric power supply.

Besides, the finger ring for a mobile phone having the 40th structure may have a structure (41st structure), which further includes an incoming alert vibration portion that notifies an incoming based on the incoming alert signal.

Besides, the finger ring for a mobile phone having the 41st structure may have a structure (42nd structure), in which the vibration output portion doubles as the incoming alert vibration portion.

Besides, the finger ring for a mobile phone having any one of the 39th to the 42nd structures may have a structure (43rd structure), which further includes a manual operation switch, wherein the short-distance wireless communication portion outputs a signal corresponding to a call/answer operation by the manual switch to the mobile phone.

Besides, in the finger ring for a mobile phone having any one of the 39th to the 43rd structures, a structure (44th structure) may be employed, in which the vibration output portion includes a piezoelectric bimorph; and the power source portion includes a voltage step-up circuit that drives the piezoelectric bimorph.

Besides, in the finger ring for a mobile phone having any one of the 39th to the 43rd structures, a structure (45th structure) may be employed, in which the vibration output portion includes an electromagnetic vibration portion.

Besides, the finger ring type mobile phone disclosed in the present specification has a structure (46th structure), which includes: a mobile phone communication portion; a vibration output portion disposed at a position that contacts a finger to convert a voice signal received by the mobile phone communication portion into a cartilage conduction vibration and outputs the cartilage conduction vibration; a microphone that converts a voice into an electric signal and outputs the signal from the mobile phone communication portion; and a power source portion that performs electric power supply to the mobile phone communication portion, the vibration output portion and the microphone.

In the meantime, the finger ring type mobile phone having the 46th structure may have a structure (47th structure), which further includes an incoming alert vibration portion that notifies an incoming.

Besides, the finger ring type mobile phone having the 47th structure may have a structure (48th structure), in which the vibration output portion doubles as the incoming alert vibration portion.

Besides, in the finger ring type mobile phone having any one of the 46th to the 48th structures, a structure (49th structure) may be employed, in which the vibration output portion includes a piezoelectric bimorph; and the power source portion includes a voltage step-up circuit that drives the piezoelectric bimorph.

Besides, in the finger ring type mobile phone having any one of the 46th to the 48th structures, a structure (50th structure) may be employed, in which the vibration output portion includes an electromagnetic vibration portion.

Besides, the voice hearing method disclosed in the present specification has a structure (51st structure) which has: a step for converting a voice signal into a cartilage conduction vibration and transmits the vibration to a finger; and a step for pressurizing the finger against a cartilage.

In the meantime, in the voice hearing method having the 51st structure, a structure (52nd structure) may be employed, in which the cartilage is a tragus cartilage.

<Other Variations>

In the meantime, besides the above embodiments, it is possible to add various modifications to the structure of the present invention without departing from the spirit of the present invention. In other words, it should be understood that the above embodiments are examples in all respects and are not limiting. The technological scope of the present invention is not indicated by the above description of the embodiments but by the claims, and all modifications within the scope of the claims and the meaning equivalent to the claims are covered.

For example, in the above embodiments, the description is performed, in which the hearing aid system and the mobile phone system are the hearing systems independent of each other; however, the structure of the present invention is not limited to this, and it is also possible to build a hearing system that includes both the hearing aide function and the mobile phone function.

INDUSTRIAL APPLICABILITY

The present invention is usable to achieve, for example, a hearing aid system and a mobile phone system that use the cartilage conduction and are useful.

REFERENCE SIGNS LIST

A finger
B ear
C ear cartilage (tragus)
1 finger ring
2 hearing device main body
3 ear piece
10 main unit
11 first board
12 piezoelectric bimorph cartilage conduction vibration portion
13 control portion
14 drive portion
15 connector
16 second board
17 operation portion
20 power source unit
21 board
22 battery
23 power source portion
24 voltage step-up portion
25 recharge circuit
30 communication unit
31 board
32 wireless communication circuit
40 cable
50 finger ring type housing
100 finger ring
101 piezoelectric bimorph cartilage conduction vibration portion
102 drive portion
103 control portion
104 power source portion 105 voltage step-up circuit
106 self-holding timer (power source switch)
107 remote control switch operation portion
108 short-distance communication portion
200 hearing aid main body
201 short-distance communication portion
202 ear piece connection portion
203 control portion
204 voice signal output portion
205 microphone
206 switch operation portion
207 power source switch
208 power source portion
300 finger ring
301 piezoelectric bimorph cartilage conduction vibration portion
302 drive portion
303 control portion
304 power source portion
305 voltage step-up circuit
306 self-holding timer (power source switch)
307 remote control switch operation portion
308 microphone
309 voice signal output portion
310 echo canceller
400 finger ring type voice transmission/reception attachment
401 piezoelectric bimorph cartilage conduction vibration portion
402 drive portion
403 control portion
404 power source portion
405 voltage step-up circuit
406 microphone
407 voice signal output portion
408 echo canceller
409 short-distance communication portion
410 call/answer operation portion
500 mobile phone main body
501 short-distance communication portion
502 voice signal input portion
503 voice signal output portion
504 telephone function portion
504a voice transmission portion
504b voice reception portion
504c telephone communication portion
505 microphone
506 speaker
507 display portion
508 storage portion
509 control portion
510 power source portion
511 power source switch
512 switch operation portion
600 finger ring type mobile phone
601 piezoelectric bimorph cartilage conduction vibration portion
602 drive portion
603 control portion
604 power source portion
605 voltage step-up circuit
606 microphone
607 voice signal output portion
608 echo canceller
609 voice signal input portion
610 voice signal output portion
611 telephone function portion
611a voice transmission portion
611b voice reception portion
611c telephone communication portion
612 display portion
613 storage portion
614 control portion
615 power source portion
616 power source switch
617 switch operation portion

The invention claimed is:

1. A voice signal reception attachment transmitting a vibration to a finger which is to contact an ear cartilage, used for a hearing system, comprising:
a short-distance wireless communication portion;
a vibration output portion to convert a voice signal, which is received by the short-distance wireless communication portion, into a cartilage conduction vibration and outputs the cartilage conduction vibration, the cartilage conduction vibration of the vibration output portion being transmitted to the ear cartilage via the finger with the finger contacting the ear cartilage which generates an air transmission sound in the external auditory canal to reach an eardrum;
a power source portion that performs electric power supply to the short-distance wireless communication portion and the vibration output portion; and
a power-source switch that turns on/off a power source of the power source portion, wherein the short-distance wireless communication portion outputs an on/off-state of the power source portion to outside;
wherein the power-source switch includes a self-holding function that holds the on state for a predetermined self-time span; and
wherein count operation during the self-holding time span is reset at each turning on operation of the power source portion and restarted.

2. A voice signal reception attachment transmitting a vibration to a finger which is to contact an ear cartilage, used for a hearing system, comprising:
a short-distance wireless communication portion;
a vibration output portion to convert a voice signal, which is received by the short-distance wireless communication portion, into a cartilage conduction vibration and outputs the cartilage conduction vibration, the cartilage conduction vibration of the vibration output portion being transmitted to the ear cartilage via the finger with the finger contacting the ear cartilage which generates an air transmission sound in the external auditory canal to reach an eardrum; and
a power source portion that performs electric power supply to the short-distance wireless communication portion and the vibration output portion,
wherein the vibration output portion includes a piezoelectric bimorph; and
wherein the power source portion includes a voltage step-up circuit that drives the piezoelectric bimorph.

3. The voice signal reception attachment according to claim 2, wherein the vibration output portion includes an electromagnetic vibration portion.

4. The voice signal reception attachment according to claim 2, wherein the hearing system is a hearing aid system.

5. The voice signal reception attachment according to claim 2, further comprising a microphone, whereby the voice signal reception attachment serves as a voice signal transmission/reception attachment.

6. A voice signal reception attachment transmitting a vibration to a finger which is to be pressurized against an ear cartilage, used for a mobile phone system as a hearing system, comprising:
- a short-distance wireless communication portion;
- a vibration output portion to convert a voice signal, which is received by the short-distance wireless communication portion, into a cartilage conduction vibration and outputs the cartilage conduction vibration, the cartilage conduction vibration of the vibration output portion being transmitted to the ear cartilage via the finger with the finger contacting the ear cartilage which generates an air transmission sound in the external auditory canal to reach an eardrum;
- a power source portion that performs electric power supply to the short-distance wireless communication portion and the vibration output portion;
- a control portion that receives an incoming signal via the short-distance wireless communication portion to make the power source portion start the electric power supply; and
- an incoming alert vibration portion that notifies a phone call based on the incoming signal.

7. The voice signal reception attachment according to claim 6, wherein the vibration output portion doubles as the incoming alert vibration portion.

8. A voice signal reception attachment transmitting a vibration to a finger which is to contact an ear cartilage, used for a mobile phone system as a hearing system, comprising:
- a short-distance wireless communication portion;
- a vibration output portion to convert a voice signal, which is received by the short-distance wireless communication portion, into a cartilage conduction vibration and outputs the cartilage conduction vibration, the cartilage conduction vibration of the vibration output portion being transmitted to the ear cartilage via the finger with the finger contacting the ear cartilage which generates an air transmission sound in the external auditory canal to reach an eardrum;
- a power source portion that performs electric power supply to the short-distance wireless communication portion and the vibration output portion; and
- a manual operation switch, wherein the short-distance wireless communication portion outputs a signal corresponding to a call/answer operation by the manual switch to the mobile phone.

9. A voice signal reception attachment transmitting a vibration to a finger which is to contact an ear cartilage, used for a mobile phone system as a hearing system, comprising:
- a short-distance wireless communication portion;
- a vibration output portion to convert a voice signal, which is received by the short-distance wireless communication portion, into a cartilage conduction vibration and outputs the cartilage conduction vibration, the cartilage conduction vibration of the vibration output portion being transmitted to the ear cartilage via the finger with the finger contacting the ear cartilage which generates an air transmission sound in the external auditory canal to reach an eardrum; and
- a power source portion that performs electric power supply to the short-distance wireless communication portion and the vibration output portion,
- wherein the vibration output portion includes a piezoelectric bimorph; and
- wherein the power source portion includes a voltage step-up circuit that drives the piezoelectric bimorph.

10. The voice signal reception attachment according to claim 8, wherein the vibration output portion includes an electromagnetic vibration portion.

11. The voice signal reception attachment according to claim 8, wherein the ear cartilage is of a tragus.

* * * * *